(12) United States Patent
Tani et al.

(10) Patent No.: US 11,867,496 B2
(45) Date of Patent: Jan. 9, 2024

(54) MEASUREMENT SYSTEM, MEASUREMENT SUPPORT METHOD, AND COMPUTER-READABLE MEDIUM

(71) Applicant: Evident Corporation, Nagano (JP)

(72) Inventors: Yosuke Tani, Tokyo (JP); Hirofumi Hori, Tokyo (JP); Takahiro Furukawa, Tokyo (JP); Tsukasa Nittono, Tokyo (JP); Takayuki Komiya, Tokyo (JP)

(73) Assignee: Evident Corporation, Nagano (JP)

( * ) Notice: Subject to any disclaimer, the term of this patent is extended or adjusted under 35 U.S.C. 154(b) by 74 days.

(21) Appl. No.: 17/493,745

(22) Filed: Oct. 4, 2021

(65) Prior Publication Data

US 2022/0107169 A1 Apr. 7, 2022

(30) Foreign Application Priority Data

Oct. 6, 2020 (JP) .................................. 2020-169375

(51) Int. Cl.
*G01B 11/06* (2006.01)
*G06T 7/40* (2017.01)
*G01B 11/30* (2006.01)

(52) U.S. Cl.
CPC ........ *G01B 11/0608* (2013.01); *G01B 11/303* (2013.01); *G06T 7/40* (2013.01); *G06T 2207/10056* (2013.01)

(58) Field of Classification Search
CPC ........................... G01B 11/0608; G01B 11/303
See application file for complete search history.

(56) References Cited

U.S. PATENT DOCUMENTS

| 2016/0275689 A1 | 9/2016 | Fujii et al. |
| 2018/0180403 A1* | 6/2018 | Akishiba ............ G01B 11/0608 |
| 2020/0400775 A1* | 12/2020 | Wakana ................ G01S 5/0244 |

FOREIGN PATENT DOCUMENTS

| JP | 2016173294 A | 9/2016 |
| JP | 2019045324 A | 3/2019 |

* cited by examiner

*Primary Examiner* — Hina F Ayub
(74) *Attorney, Agent, or Firm* — Holtz, Holtz & Volek PC

(57) ABSTRACT

A measurement system includes: an optical measurement instrument that measures a surface of a specimen; and a control apparatus that controls the measurement instrument. The control apparatus includes: one or more non-transitory computer-readable media that include an instruction; and one or more processors that execute the instruction. The instruction is configured to cause the one or more processors to execute an operation. The operation includes: causing the measurement instrument to repetitively measure the surface of the specimen without changing the setting; and evaluating appropriateness of the setting for measuring surface texture of the specimen, based on comparison between a measurement value of the surface texture of the specimen calculated from a measurement data item output from the measurement instrument, and a degree of variation in measurement by the measurement instrument calculated from a plurality of measurement data items output from the measurement instrument.

15 Claims, 20 Drawing Sheets

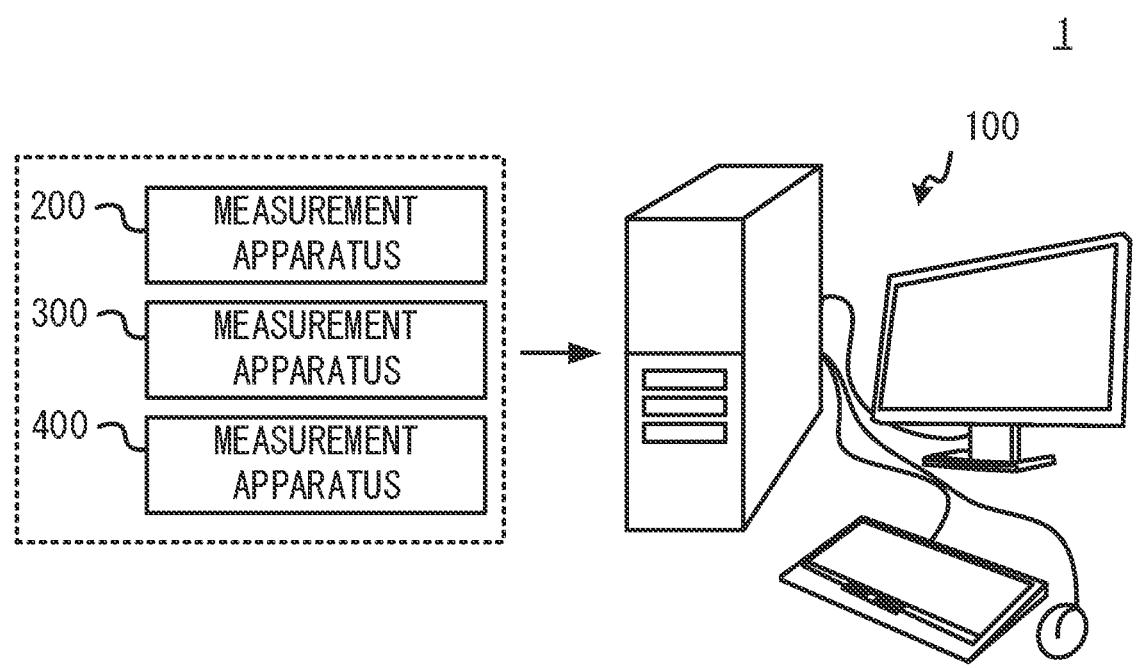
F I G. 1

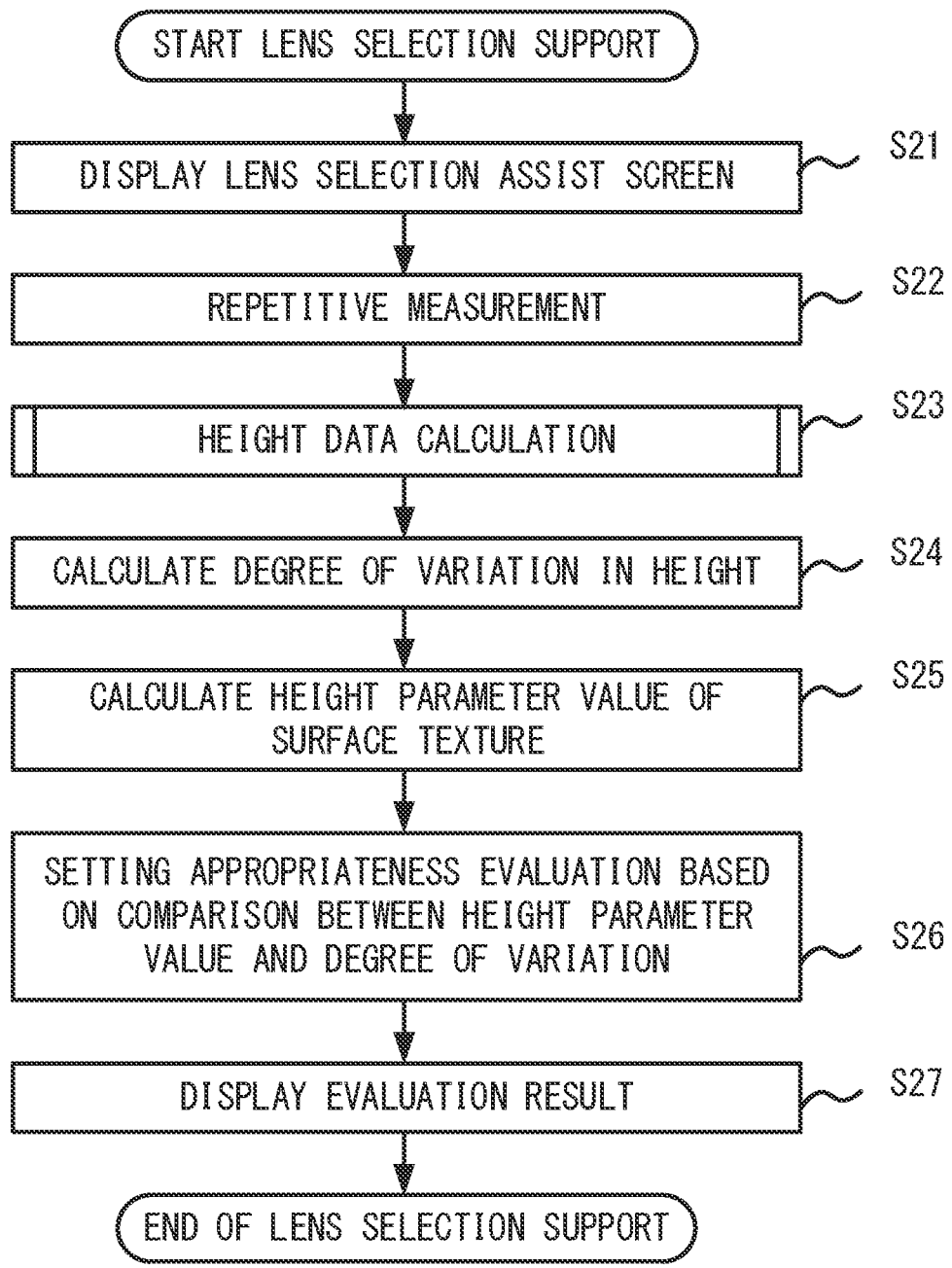
F I G. 7

MEASUREMENT SYSTEM, MEASUREMENT SUPPORT METHOD, AND COMPUTER-READABLE MEDIUM

CROSS REFERENCE TO RELATED APPLICATIONS

This application is based upon and claims the benefit of priority from prior Japanese Patent Applications No. 2020-169375, filed Oct. 6, 2020, the entire contents of which are incorporated herein by this reference.

BACKGROUND OF THE INVENTION

Field of the Invention

The disclosure of this specification relates to a measurement system, a measurement support method, and a computer-readable medium.

Description of the Related Art

The surfaces of components constituting industrial products require various functionalities depending on usages. For example, the surfaces of cylinder inner wall components of engines of automobiles require abrasion resistance. The surfaces of package elements of electronic components to be integrated require thermal dissipation. Components to be implanted into bodies, such as dental implants, require compatibility with biological tissue. Besides such physical and chemical functionalities, aesthetic functionalities, such as beauty in appearance, luster, and appearance quality, are also required. Accompanied by improvement in development and functionality of industrial products, correct evaluation of functionalities of the surfaces as described above, and quantitative quality management become increasingly important.

Methods of using evaluation indices, which are called surface texture parameters, have been known as methods of evaluating the functionalities of surfaces. Such parameters are defined by industrial standards or international standards, such as JIS (Japanese Industrial Standards) or ISO (International Standards Organization).

In a case of evaluation by surface texture parameters, conventionally, stylus-type surface roughness measurement instruments have typically been used as measurement instruments. Currently, non-contact type measurement instruments that use light and can easily obtain data without scratching measurement target objects are mainly used.

Such optical measurement instruments are described in, for example, Japanese Patent Laid-Open No. 2016-173294. The measurement instrument described in Japanese Patent Laid-Open No. 2016-173294 can calculate one or more scores for each pixel (measurement point), and evaluate the reliability of measurement data on a pixel-by-pixel basis using a total score calculated from one or more calculated scores. Accordingly, the effectiveness of the measurement data can be evaluated on a pixel-by-pixel basis.

SUMMARY OF THE INVENTION

A measurement system according to an embodiment of the present invention includes: an optical measurement instrument that measures a surface of a specimen; and a control apparatus that controls the measurement instrument, wherein the control apparatus includes: one or more non-transitory computer-readable media that include an instruction; and one or more processors that execute the instruction, wherein the instruction is configured to cause the one or more processors to execute an operation, and the operation includes: causing the measurement instrument to repetitively measure the surface of the specimen without changing a setting; and evaluating appropriateness of the setting for measuring surface texture of the specimen, based on comparison between a measurement value of the surface texture of the specimen calculated from a measurement data item output from the measurement instrument, and a degree of variation in measurement by the measurement instrument calculated from a plurality of measurement data items output from the measurement instrument.

A measurement support method according to an embodiment of the present invention includes: repetitively measuring a surface of a specimen without changing a setting of a measurement instrument; and evaluating appropriateness of the setting for measuring surface texture of the specimen, based on comparison between a measurement value of the surface texture of the specimen calculated from a measurement data item output from the measurement instrument, and a degree of variation in measurement by the measurement instrument calculated from a plurality of measurement data items output from the measurement instrument.

A computer-readable medium according to an embodiment of the present invention is a non-transitory computer-readable medium storing a program, the program causes a computer to execute processes of: causing a measurement instrument to repetitively measure a surface of a specimen without changing a setting; and evaluating appropriateness of the setting for measuring surface texture of the specimen, based on comparison between a measurement value of the surface texture of the specimen calculated from a measurement data item output from the measurement instrument, and a degree of variation in measurement by the measurement instrument calculated from a plurality of measurement data items output from the measurement instrument.

BRIEF DESCRIPTION OF THE DRAWINGS

The present invention will be more apparent from the following detailed description when the accompanying drawings are referenced.

FIG. 1 exemplifies a configuration of a measurement system 1;

FIG. 7 is a flowchart showing an example of a lens selection support process according to a first embodiment;

DETAILED DESCRIPTION OF THE PREFERRED EMBODIMENTS

Figure 2:
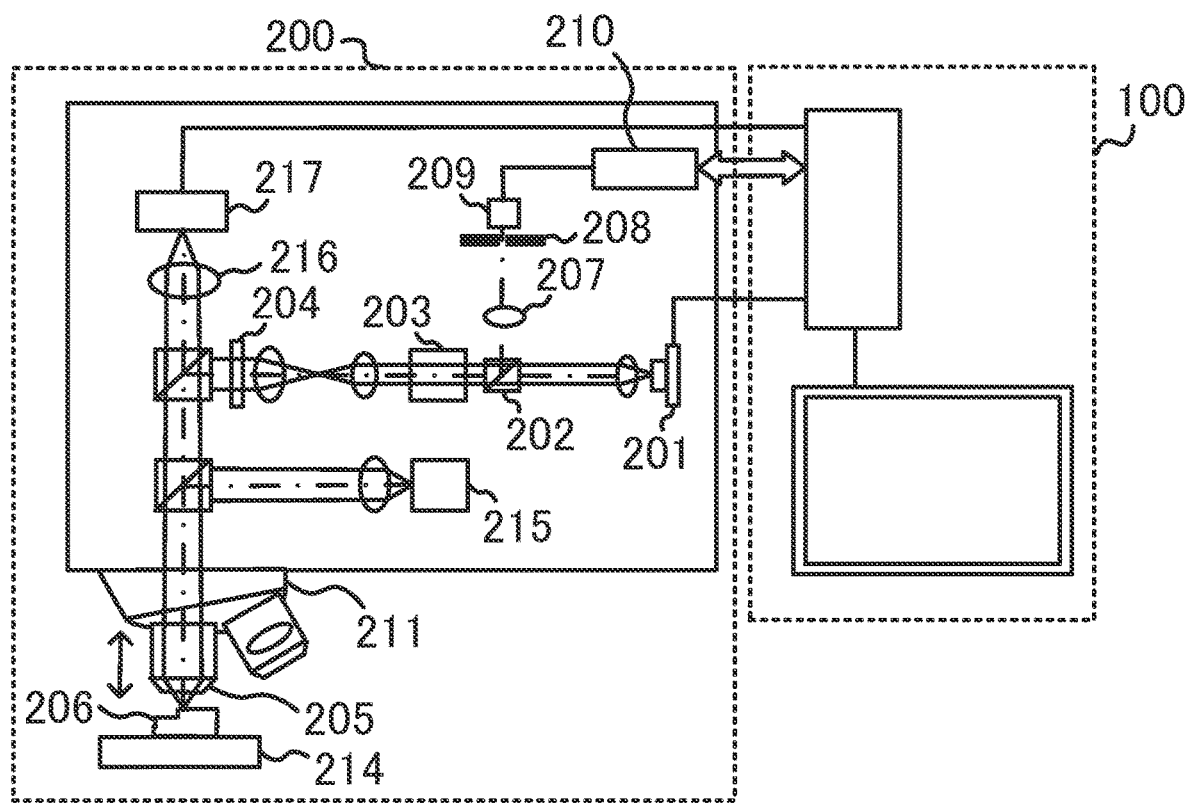
FIG. 2 exemplifies a configuration of a measurement apparatus 200.

According to the optical measurement instrument as described in Japanese Patent Laid-Open No. 2016-173294, the size of the measurement range, and measurement precision have a trade-off relationship. Selection of an objective lens that has a dominant impact on them is significantly important. For example, if erroneous selection of the objective lens excessively widens a range to be measured at one time, the required accuracy cannot be secured. Accordingly, a situation can occur where evaluation is mistakenly made based on measurement data having low reliability.

Meanwhile, the surface roughness of measurement target objects is often unknown. Consequently, it is not easy to predict required precision. In recent years, cases where an operation of measuring surface textures originally handled by a dedicated operator is handled by a non-dedicated operator have been increasing. In particular, it is not easy for such a non-dedicated operator to predict required precision and select an appropriate objective lens.

Note that the case where selection of the objective lens about which settings with insufficient measurement precision tend to be selected by the user intending to measure a wide range at one time has been described above as an example. The problem described above can similarly occur also generally in settings of measurement instruments that affect the measurement precision.

Given circumstances like the above, embodiments of the present invention will be described hereinafter.

FIG. 1 exemplifies a configuration of a measurement system 1. As shown in FIG. 1, the measurement system 1 includes a control apparatus 100, and one or more measurement apparatuses (a measurement apparatus 200, a measurement apparatus 300, and a measurement apparatus 400) that output measurement data to the control apparatus 100. Each of the one or more measurement apparatuses is an optical measurement instrument that measures the surface of a sample or a specimen (hereinafter, each of these items is described as a specimen, unless specifically discriminated) and is, for example, a confocal microscope apparatus, a white light interferometer or the like. The control apparatus 100 is an apparatus that controls the one or more measurement apparatuses. The measurement system 1 measures the surface texture of a specimen by causing the control apparatus 100 to control the measurement apparatus.

The measurement system 1 further evaluates the appropriateness of the setting of the measurement apparatus so as to allow a user to easily grasp the suitability of the setting of the measurement apparatus used to measure the surface texture, in order to avoid a user's erroneous evaluation based on measurement data having low reliability about the surface texture of the specimen. For example, when the surface roughness of the specimen is measured, higher measurement precision is required for a case of measuring a relatively smoother specimen than a case of measuring a relatively rougher specimen. The appropriateness of the setting of the measurement apparatus depends on the specimen to be measured. Consequently, in a stricter sense, the measurement system 1 evaluates the appropriateness of the setting of the measurement apparatus, for measurement of the surface texture of the specimen to be measured. Accordingly, it can be easily recognized whether the measurement data can be relied on or not. The measurement system 1 can, therefore, measure the surface texture with high reliability according to an instruction by the user or automatically.

The measurement data in this specification is data generated by the measurement apparatus performing measurement. Although not specifically limited, setting the of the measurement apparatus includes, for example, a setting of the objective lens, i.e., which objective lens is used for measurement. The setting of the measurement apparatus further includes another setting affecting measurement precision, such as the wavelength of light used for measurement, for example.

FIG. 2 exemplifies the configuration of the measurement apparatus 200. The measurement apparatus 200 is a microscope apparatus that obtains image data on specimens, and more specifically, a laser scanning microscope apparatus. That is, the measurement apparatuses, which are included in the measurement system 1 or output measurement data to the control apparatus 100, may include a microscope apparatus. The measurement apparatuses may include a laser scanning microscope apparatus. The measurement system 1, which includes the measurement apparatus 200 and the control apparatus 100, may be a laser scanning microscope system. Hereinafter, referring to FIG. 2, the configuration of the measurement apparatus 200 is specifically described.

The measurement apparatus 200 includes a laser light source 201, a polarization beam splitter (hereinafter described as a PBS) 202, a scanning unit 203 that is scanning means for scanning a specimen 206, a ¼λ plate 204, an objective lens 205, an imaging lens 207, a pinhole plate 208, an optical detector 209, an AD converter 210, a revolver 211, an X-Y stage 214, a white light source 215, an imaging lens 216, and a camera 217.

The revolver 211 is means for switching the objective lens 205, and also functions as means for changing the relative distance between the objective lens 205 and the specimen 206. That is, in the measurement system 1, the revolver 211 is an example of scanning means for scanning the specimen 206 in the optical axis direction of the objective lens 205, and the scanning unit 203 is an example of scanning means for scanning the specimen 206 in directions orthogonal to the optical axis. The X-Y stage 214 is an example of means for moving the specimen 206 in the directions orthogonal to the optical axis of the objective lens 205 relative to this objective lens 205.

Laser light output from the laser light source 201 passes through the PBS 202, and subsequently enters the scanning unit 203. The scanning unit 203 includes, for example, a galvano scanner and a resonant scanner that can scan with light in directions orthogonal to each other. The laser light deflected by the scanning unit 203 is converted from linear polarization into circular polarization by the ¼λ plate 204, and is subsequently emitted to the specimen 206 through the objective lens 205 attached to the revolver 211.

In the measurement apparatus 200, the pair of scanners included in the scanning unit 203 are arranged at positions optically conjugate with the pupil position of the objective lens 205 or adjacent thereto. Accordingly, the scanning unit 203 deflects the laser light, which moves the laser light condensing position on the focal plane of the objective lens 205 in the XY direction orthogonal to the optical axis of the objective lens. Accordingly, the specimen 206 is two-dimensionally scanned with the laser light.

Here, two-dimensional scanning (XY scanning) by the scanning unit 203, and driving of the revolver 211 in the optical axis direction (Z direction) of the objective lens 205 are controlled by the control apparatus 100 that controls the measurement apparatus 200. That is, the control apparatus 100 is an example of scanning control means for controlling the scanning means. Note that the two-dimensionally scanning method by the scanning unit 203 is not specifically limited. For example, raster scanning, which is typically used by a confocal microscope, may be adopted. Switching of the objective lens 205 disposed on the optical path of the measurement apparatus 200 by rotational driving of the revolver 211, and driving of the X-Y stage 214 in the directions (XY directions) orthogonal to the optical axis of the objective lens 205 are also controlled by the control apparatus 100.

Laser light reflected by the surface of the specimen 206 (hereinafter described as reflected light) passes through the objective lens 205, enters the ¼λ plate 204, is converted by this plate from circular polarization into linear polarization, and subsequently passes through the scanning unit 203 and enters the PBS 202. At this time, the reflected light entering the PBS 202 has a polarization plane orthogonal to the polarization plane of laser light entering the PBS 202 from the laser light source 201 side. Accordingly, the reflected light is reflected by the PBS 202 and is guided to the imaging lens 207.

The imaging lens 207 condenses the reflected light reflected by the PBS 202. On the pinhole plate 208 provided on the reflection optical path from the PBS 202, a pinhole is formed on a position optically conjugate with the condensing position of laser light formed on the focal plane of the objective lens 205. Accordingly, in a case where a certain portion on the surface of the specimen 206 is at the condensing position of laser light by the objective lens 205, reflected light from this portion is condensed at the pinhole, and passes through this pinhole. On the other hand, in a case where the certain portion on the surface of the specimen 206 deviates from the condensing position of laser light by the objective lens 205, reflected light from this portion is not condensed at the pinhole. Accordingly, the reflected light does not pass through the pinhole, and is blocked by the pinhole plate 208.

The light having passed through the pinhole is detected by the optical detector 209. The optical detector 209 is, for example, a photomultiplier tube (PMT), an avalanche photodiode (APD) or the like. The optical detector 209 receives the light having passed through the pinhole, i.e., reflected light from a portion matching the condensing position of the laser light by the objective lens 205 on the surface of the specimen 206. A detection signal having an intensity according to the amount of received light is output as a luminance signal indicating the luminance of this portion. The luminance signal, which is an analog signal, is analog/digital-converted by the AD converter 210, and then input, as luminance value information indicating the luminance of this portion, into the control apparatus 100. That is, the measurement apparatus 200 outputs, to the control apparatus 100, the measurement data that includes the luminance value information and scanning position information from the scanning unit 203. Note that in this case, the measurement data is confocal image data that is a set of luminance values at corresponding coordinates.

On the other hand, light (white light) emitted from the white light source 215 is condensed at the pupil position of the objective lens 205 attached to the revolver 211, and subsequently is emitted to the specimen 206. Accordingly, the specimen 206 is illuminated by the Köhler illumination method. Reflected light reflected by the surface of the specimen 206 enters the imaging lens 216. The imaging lens 216 condenses the reflected light on the light receiving surface of the camera 217.

The camera 217 is a camera that includes the light receiving surface at the position optically conjugate with the focal plane of the objective lens 205, and is, for example, a color CCD (charge-coupled device) camera that includes a CCD image sensor, and a color CMOS (complementary MOS) camera that includes a CMOS image sensor. The camera 217 images the specimen 206 using reflected light condensed on the light receiving surface, and outputs non-confocal image data obtained by imaging, to the control apparatus 100. That is, the measurement apparatus 200 outputs measurement data that is non-confocal image data on the specimen 206, to the control apparatus 100. Note that in this case, the measurement data is non-confocal image data that is a set of pieces of color information at corresponding coordinates.

Figure 3:
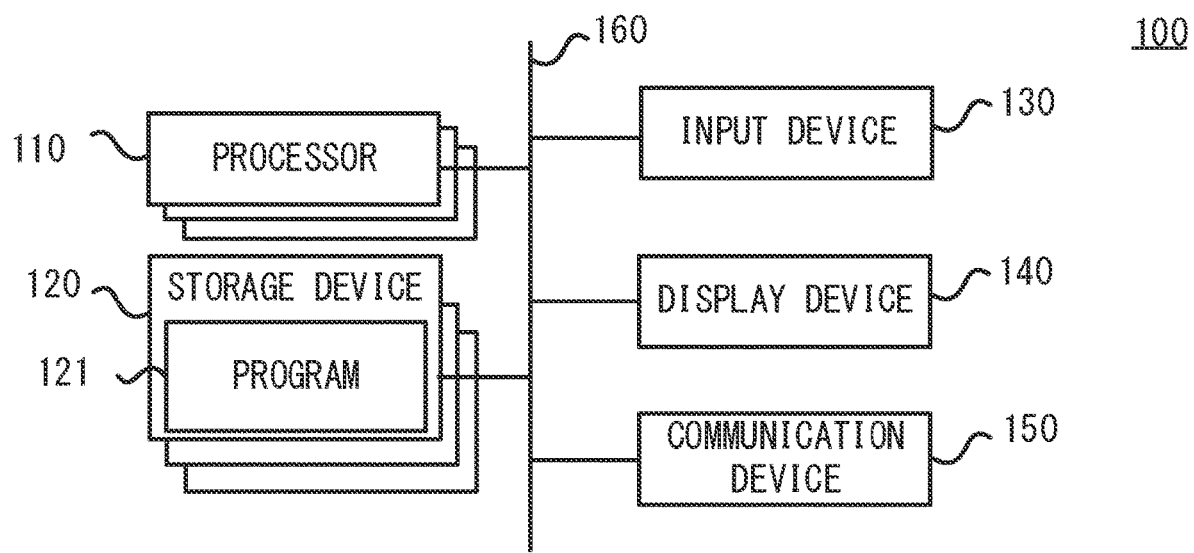
FIG. 3 exemplifies a configuration of a control apparatus 100.

FIG. 3 exemplifies the configuration of the control apparatus 100. The control apparatus 100 is a microscope control apparatus that constitutes a microscope system, together with the measurement apparatus 200, which is the microscope apparatus. Hereinafter, referring to FIG. 3, the configuration of the control apparatus 100 is specifically described.

The control apparatus 100 is an apparatus that controls the measurement apparatus, and obtains measurement data generated by this measurement apparatus. Specifically, the control apparatus 100 controls imaging of the specimen by the measurement apparatus 200, and obtains, from this measurement apparatus 200, the measurement data obtained by the imaging. Note that the control apparatus 100 may be any computer that includes one or more non-transitory computer-readable media that include an instruction, and one or more processors that execute the instruction. The instruction may be configured to cause the one or more processors to execute a predetermined operation.

More specifically, as shown in FIG. 3, the control apparatus 100 may include, for example, one or more processors 110, one or more storage devices 120, an input device 130, a display device 140, and a communication device 150, which may be connected to each other via a bus 160.

Each of the one or more processors 110 is, for example, hardware that includes a CPU (central processing unit), a GPU (graphics processing unit), and a DSP (digital signal processor), and executes a program 121 stored in the one or more storage devices 120, thereby performing programmed processes. The one or more processors 110 may include an ASIC (application specific integrated circuit), and an FPGA (field-programmable gate array).

Each of the one or more storage devices 120 includes, for example, one or more freely selected semiconductor memories, and may further include one or more other storage devices. The semiconductor memories include, for example, volatile memories such as RAMs (random access memories), and nonvolatile memories such as ROMs (read only memories), programmable ROMs and flash memories. The RAMs may include, for example, DRAMs (dynamic random access memories), and SRAMs (static random access memories). The other storage devices may include, for example, magnetic storage devices that include magnetic disks, and optical storage devices that include optical disks.

Note that the one or more storage devices 120 are non-transitory computer-readable media, and are examples of storage units of the measurement system 1. At least one of the storage devices 120 stores the measurement data obtained from the measurement apparatus.

The input device 130 is a device that the user directly operates, and is, for example, a keyboard, a mouse, a touch panel, etc. The display device 140 may be, for example, a liquid crystal display, an organic EL display, a CRT (cathode ray tube) display, etc. The display may internally include a touch panel. The communication device 150 may be a wired communication module, or a wireless communication module.

Note that the configuration shown in FIG. 3 is an example of the hardware configuration of the control apparatus 100. The control apparatus 100 is not limited to this configuration. The control apparatus 100 is not limited to a general purpose apparatus, but may be a dedicated apparatus. The control apparatus 100 may be configured integrally with the measurement apparatus 200. That is, the measurement system 1 may be made up of a single apparatus, or include multiple apparatuses.

The control apparatus 100 configured as described above may control the measurement apparatus 200 by the processors 110 executing the program 121, and obtain confocal image data or non-confocal image data that is measurement data output from the measurement apparatus 200.

The control apparatus 100 may measure the surface texture of the specimen 206, and calculate the measurement value of the surface texture, based on the measurement data. The measurement value of the surface texture is, for example, a three-dimensional surface texture parameter value, but may be a two-dimensional surface shape parameter value instead. The two-dimensional surface shape parameter is a linear roughness (e.g., Ra) or the like. The three-dimensional surface texture parameter may be a planar roughness (e.g., Sa). The measurement value of the surface texture may be a value representing the surface texture (including the surface shape), and is not necessarily limited to the surface texture parameter.

More specifically, the control apparatus 100 may control the measurement apparatus 200 to change the relative distance between the specimen 206 and the objective lens 205, or obtain confocal image data and non-confocal image data from the measurement apparatus 200 every time the relative distance changes by a predetermined value. Subsequently, the control apparatus 100 may compare the luminance values of pixels having the same coordinates between obtained image data items (pixels having the same coordinates on the plane orthogonal to the Z direction). The maximum luminance value, and position information in the Z direction (height data) when image data having the maximum luminance value is obtained may be detected on a pixel-by-pixel basis. The control apparatus 100 may generate three-dimensional (3D) data, such as laser extended image data, color extended image data, and height image data, based on the multiple image data items, the maximum luminance value and the height data at each pixel. The control apparatus 100 may calculate the height parameter (roughness parameter) of the surface texture, from the height data generated based on the measurement data. That is, the control apparatus 100 may calculate the height parameter of the surface texture, based on the measurement data.

Furthermore, the control apparatus 100 may evaluate the appropriateness of the setting of the measurement apparatus 200. A notification of the evaluation result about the appropriateness of the setting may be issued to the user by a method of displaying by the display device 140 or the like. The evaluation result may be used to control the measurement apparatus 200. The control apparatus 100 may change the setting of the measurement apparatus 200 to an appropriate setting for measurement of the surface texture of the specimen 206, based on the evaluation result.

Figure 4:
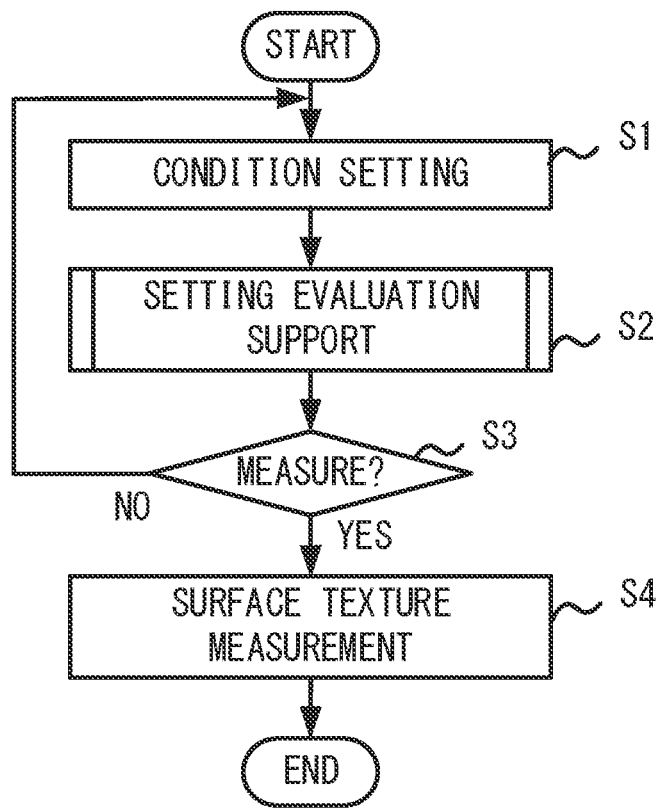
FIG. 4 is a flowchart showing an example of processing that the control apparatus 100 performs.
Figure 5:
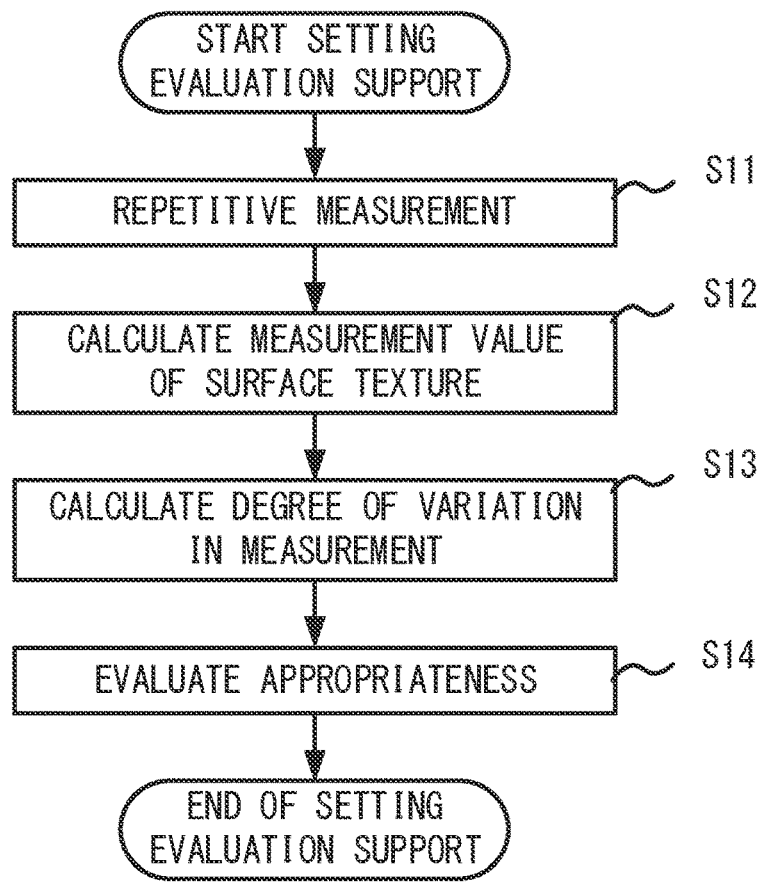
FIG. 5 is a flowchart showing an example of a setting evaluation support process.

FIG. 4 is a flowchart showing an example of processes that the control apparatus 100 performs. FIG. 5 is a flowchart showing an example of a setting evaluation support process. Hereinafter, referring to FIGS. 4 and 5, a measurement method and a measurement support method performed in the measurement system 1 are described. Note that the processing shown in FIG. 5 is an example of the measurement support method, and is performed by the processors 110 executing the program 121.

After the processing shown in FIG. 4 is started, the control apparatus 100, for example, detects an input by the user about the setting of the measurement apparatus 200, and performs condition setting for the measurement apparatus 200 (step S1). More specifically, the processors 110 change the setting of the measurement apparatus 200 so as to perform measurement through the objective lens designated by the user, for example.

After the condition setting is finished, the control apparatus 100 starts a setting support process shown in FIG. 5 (step S2). First, the control apparatus 100 causes the measurement apparatus 200 to repetitively measure the surface of the specimen 206 (step S11). Here, the control apparatus 100 causes the measurement apparatus 200 to measure the same region on the surface of the specimen 206 multiple times (e.g., five times) without changing the setting of the measurement apparatus 200 performed in step S1, and obtains multiple (e.g., five sets of) measurement data items. Note that each measurement is, for example, z-stack imaging that repeats imaging while changing the position in the z direction in a predetermined height range.

After the measurement data is obtained, the control apparatus 100 calculates the measurement value of the surface texture (step S12). Here, although not specifically limited, for example, the surface texture parameter value is calculated as the measurement value of the surface texture. More specifically, the height parameter value of the surface texture (i.e., the surface roughness parameter value) may be calculated. For example, Sa (arithmetic average height), Sz (maximum height), or Sq (root-mean-square height), which is a typical height parameter, may be calculated.

Furthermore, after the measurement data is obtained, the control apparatus 100 calculates the degree of variation in measurement (step S13). Here, the control apparatus 100 calculates the degree of variation in measurement, i.e., the precision, based on a plurality of measurement data items obtained by the control apparatus 100 measuring the same region in step S11. More specifically, the control apparatus 100 calculates the degree of variation by statistically processing the measurement data items. Note that FIG. 4 shows the example where step S12 is performed before step S13. Alternatively, step S13 may be performed before step S12, or steps S12 and S13 may be performed temporally in parallel.

After the measurement value and the degree of variation are calculated, the control apparatus 100 evaluates the appropriateness of the setting of the measurement apparatus 200 (step S14). Here, the control apparatus 100 evaluates the appropriateness of the current setting of the measurement apparatus 200 for measuring surface texture of the specimen 206, based on comparison between the measurement value of the surface texture of the specimen 206 calculated in step S12, and on the degree of variation in measurement by the measurement apparatus 200 calculated in step S13. More specifically, the control apparatus 100 evaluates the appropriateness of the setting, based on the ratio between the measurement value and the degree of variation, for example. For example, when the degree of variation is excessive over the measurement value, the measurement value is possibly largely affected by noise, which reduces the reliability of the measurement value. Accordingly, in such a case, the control apparatus 100 evaluates the appropriateness of the setting as low. On the other hand, when the degree of variation is sufficiently low to the measurement value, it can be determined that the measurement value is little affected by noise, which improves the reliability of the measurement value. Accordingly, in such a case, the control apparatus 100 evaluates the appropriateness of the setting as high.

Note that the evaluation of the appropriateness of the setting is only required to include, for example, the evaluation of the reliability of setting, i.e., the evaluation of whether the precision of the measurement data is at a sufficient level or not. The evaluation of the appropriateness of setting may include, in addition to the evaluation of reliability, another evaluation such as of the measurement time period, for example. This evaluation may be a comprehensive evaluation of evaluations in multiple views including the evaluation of reliability. Consequently, the control apparatus 100 may comprehensively evaluate the setting of the measurement apparatus 200 in consideration not only of the evaluation of reliability based on the ratio between the measurement value and the degree of variation but also additionally of another evaluation.

After the appropriateness evaluation is finished and the setting evaluation support process shown in FIG. 5 is finished, the control apparatus 100 determines whether to measure the surface texture of the specimen 206 with the current setting or not (step S3). Here, the control apparatus 100 may determine whether to perform measurement or not according to an input by the user having confirmed the evaluation result in step S14. Alternatively, the control apparatus 100 itself may automatically determine whether to perform measurement or not, based on the evaluation result in step S14.

When it is determined not to perform measurement (NO in step S3), the control apparatus 100 may start afresh the processes from step S1. When it is determined to perform measurement (YES step S3), the control apparatus 100 causes the measurement apparatus 200 to measure the specimen 206 with the current setting, and measure the surface texture of the specimen 206, based on the measurement data output from the measurement apparatus 200 (step S4).

Note that when the surface texture that the user intends to measure is the surface texture indicated by the measurement value having already been calculated in step S12, step S4 may be omitted. The surface texture measured in step S4 may be the surface texture measured in step S12 (e.g., Sa). In addition to the surface texture measured in S12 (e.g., Sa), another surface texture (e.g., Sz or Sq) may be measured. Alternatively, without measurement of the surface texture measured in step S12 (e.g., Sa), another surface texture (e.g., Sz or Sq) may be additionally measured.

As described above, the measurement system 1 executes the measurement support method shown in FIG. 5 to thereby evaluate the appropriateness of the current setting of the measurement apparatus 200, for measurement of the surface texture of the specimen 206. Accordingly, the control apparatus 100 or the user can easily recognize the suitability of the setting of the measurement apparatus 200. Consequently, according to the measurement system 1, it can be easily recognized whether the measurement data can be relied on or not. This system can, therefore, measure the surface texture with high reliability according to an instruction by the user or automatically.

First Embodiment

Figure 6:
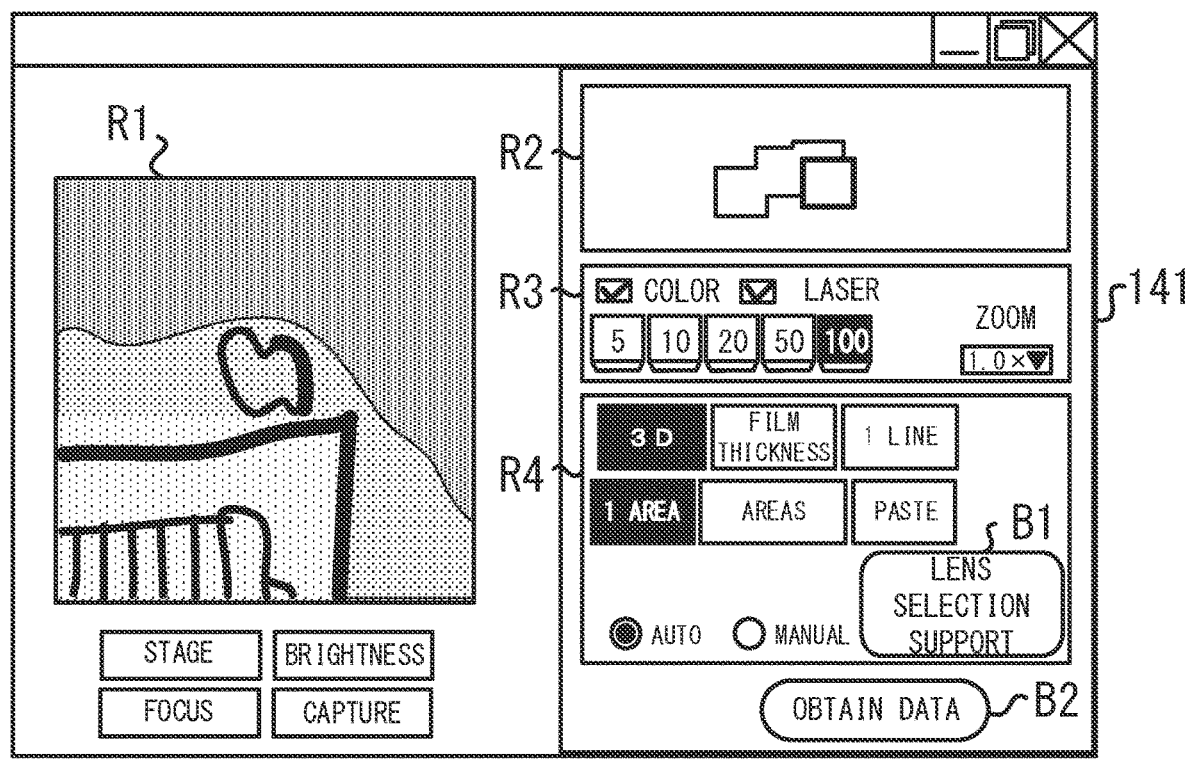
FIG. 6 exemplifies a data obtaining screen 141.
Figure 8:
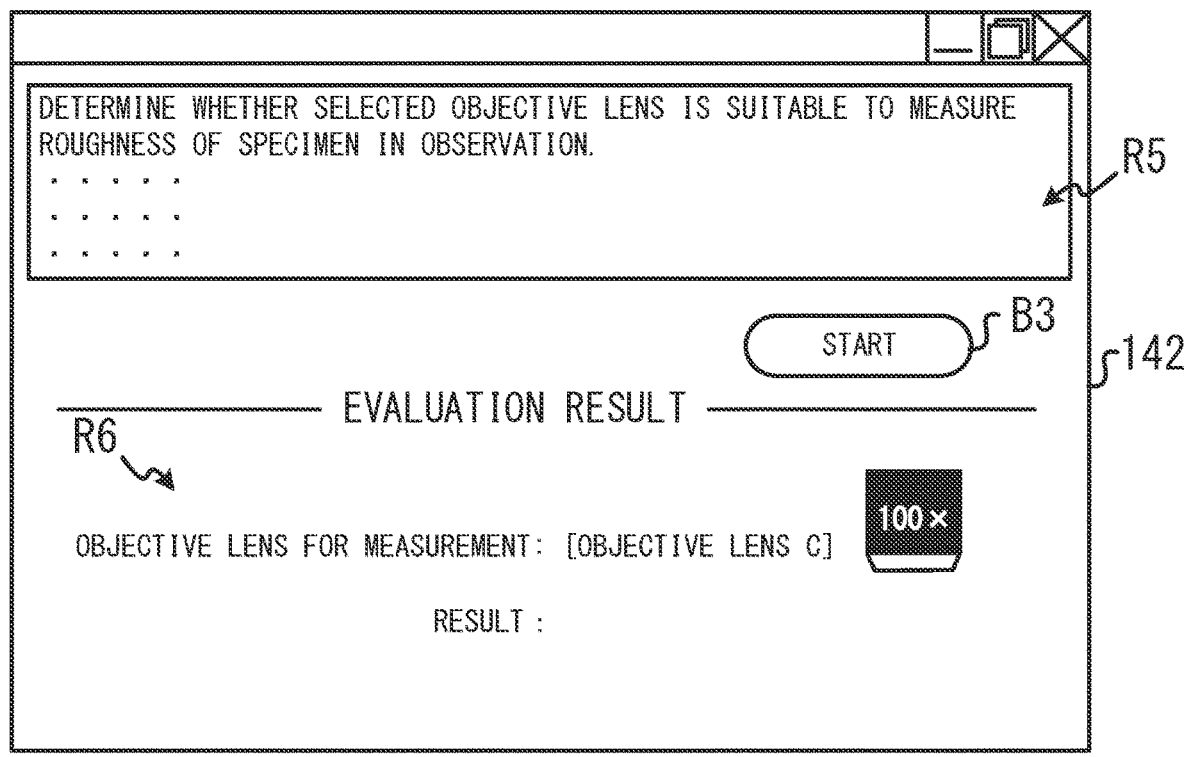
FIG. 8 exemplifies a lens selection assist screen 142 before lens evaluation.
Figure 9:
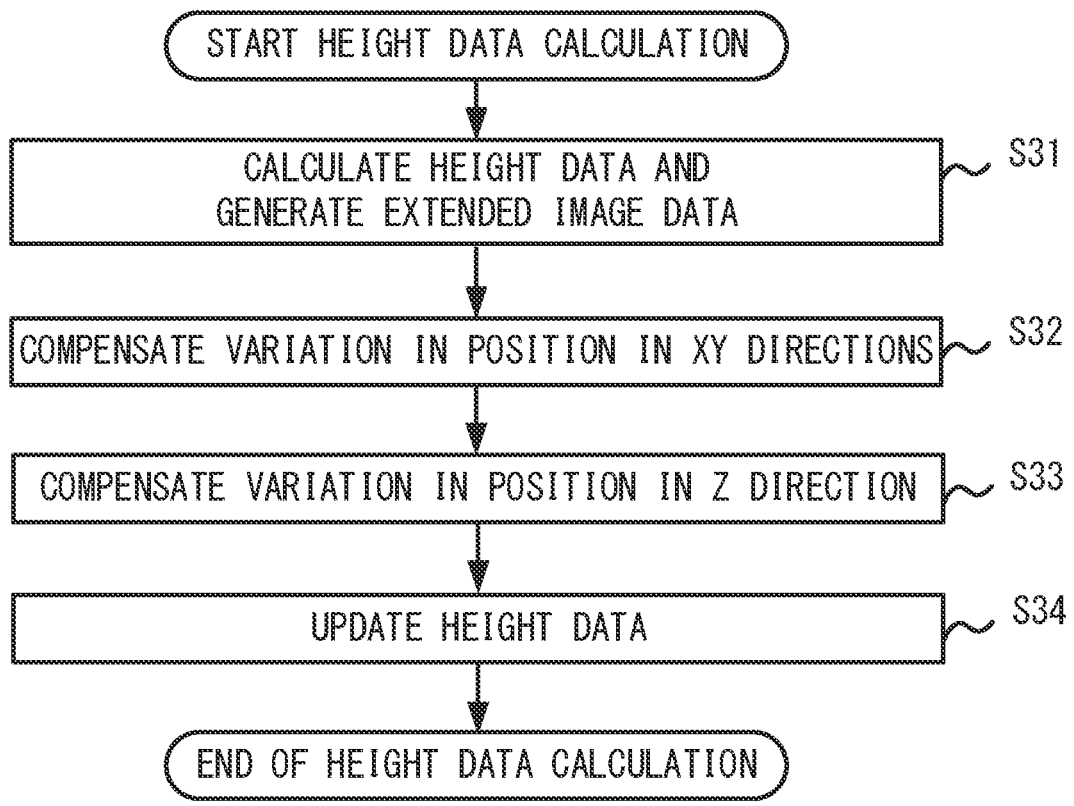
FIG. 9 is a flowchart showing an example of a height data calculation process.
Figure 10:
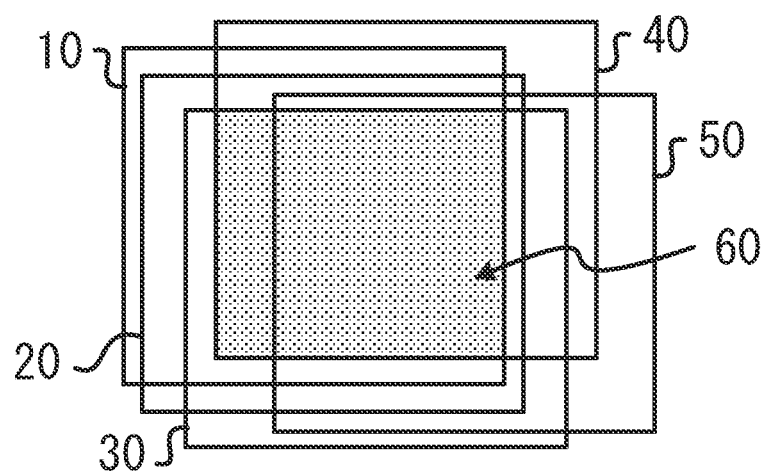
FIG. 10 is a diagram for illustrating compensation of variation in position in XY directions.
Figure 11:
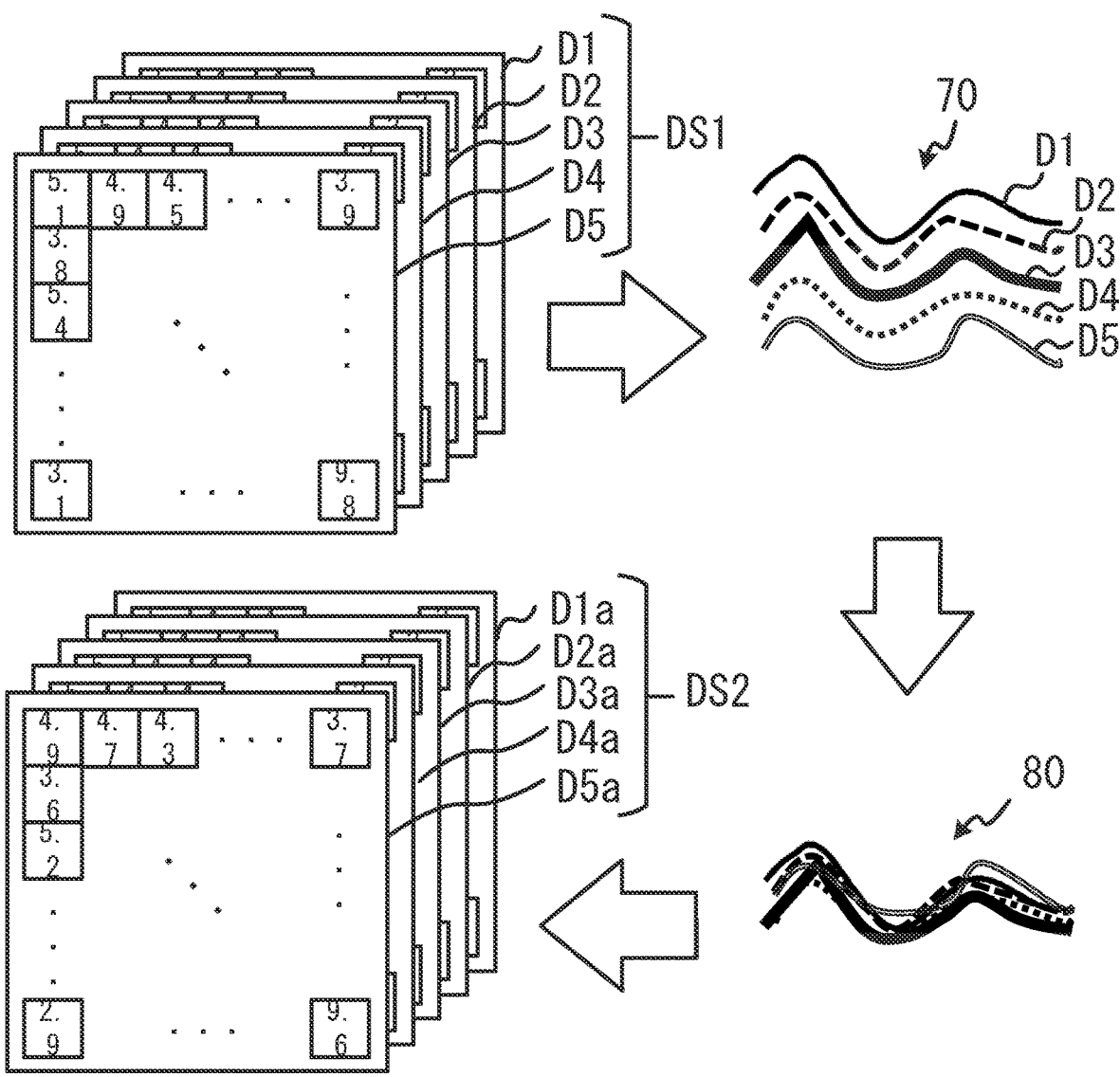
FIG. 11 is a diagram for illustrating compensation of variation in position in a Z direction.
Figure 12:
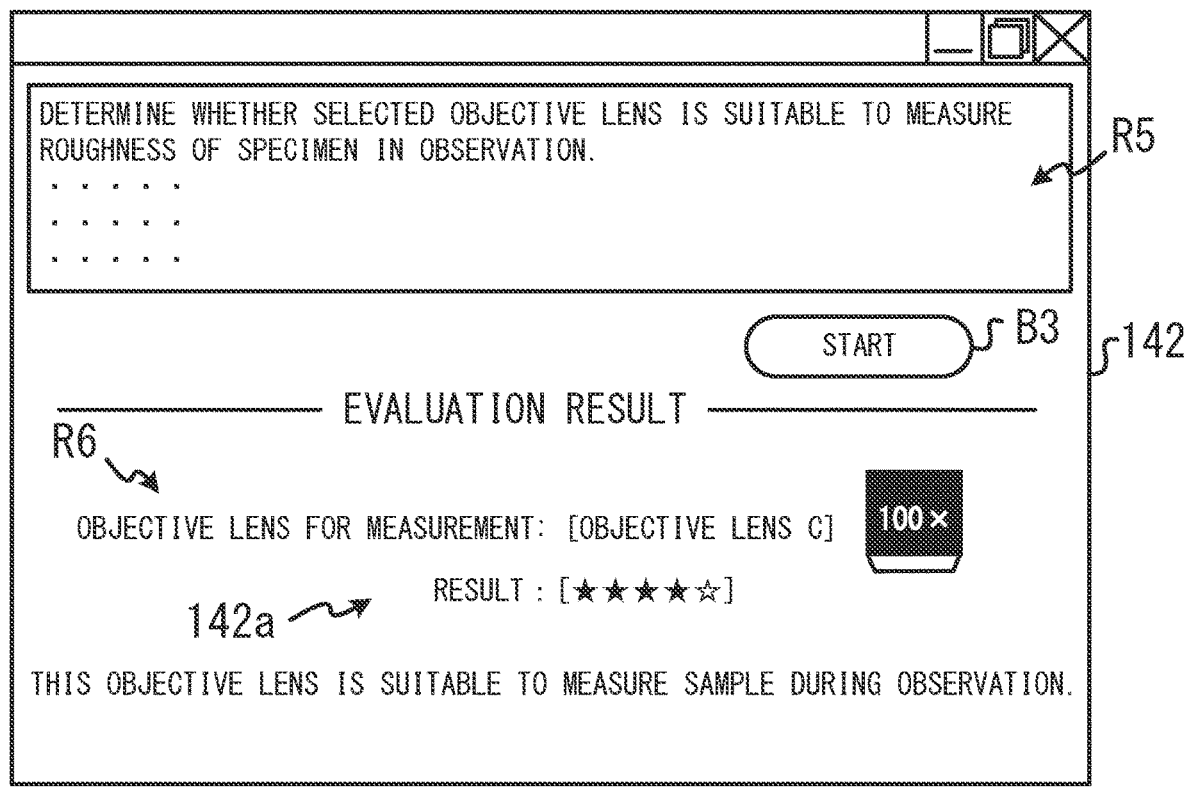
FIG. 12 shows an example of a lens selection assist screen 142 after lens evaluation.

FIG. 6 exemplifies a data obtaining screen 141. FIG. 7 is a flowchart showing an example of a lens selection support process according to this embodiment. FIG. 8 exemplifies a lens selection assist screen 142 before lens evaluation. FIG. 9 is a flowchart showing an example of a height data calculation process. FIG. 10 is a diagram for illustrating compensation of variation in position in XY directions. FIG. 11 is a diagram for illustrating compensation of variation in position in a Z direction. FIG. 12 shows an example of a lens selection assist screen 142 after lens evaluation. Hereinafter, referring to FIGS. 6 to 12, a specific example of the measurement method shown in FIG. 4 is described in detail. Note that in this embodiment, a case where the measurement system 1 notifies the user of the appropriateness of the setting of the objective lens of the measurement apparatus 200 to thereby support appropriate setting of the objective lens used for measurement by the user is described as an example.

When the processors 110 of the control apparatus 100 execute a data obtaining application program (hereinafter simply described as a program), the data obtaining screen 141 shown in FIG. 6 is displayed by the display device 140. The data obtaining screen 141 includes: a region R1 where an image is displayed based on image data obtained by the measurement apparatus 200; a region R2 where a map image and a current observation position are displayed; a region R3 where setting of observation using the measurement apparatus 200 is performed; and a region R4 where setting of a data obtaining process to be performed after a button B2 is pressed is performed.

Note that in FIG. 6, in the region R3, a setting example is indicated where the measurement apparatus 200 obtains both non-confocal image data (color) and confocal image data (laser) using a 100× objective lens (zoom magnification of one). In the region R4, a setting example is indicated where 3D data (laser extended image data, color extended image data, and height image data) is automatically obtained for one area.

The lens selection support process shown in FIG. 7 is started by, for example, the user pressing a lens selection support button (button B1) on the data obtaining screen 141. When the process shown in FIG. 7 is started, the processors 110 first cause the display device 140 to display the lens selection assist screen 142 shown in FIG. 8 (step S21). The lens selection assist screen 142 includes a region R5 where a description of the lens selection support process is displayed, and a region R6 where the result of evaluation of appropriateness of the current objective lens inserted onto the optical axis is displayed. Note that in step S21, the appropriateness of the objective lens (here, an objective lens C) has not been evaluated yet. Accordingly, in R6, no evaluation result is displayed.

Subsequently, when the user presses a start button (button B3), the processors 110 start the processes in and after step S22 (steps S22 to S27). First, the processors 110 cause the measurement apparatus 200 to repetitively measure the surface of the specimen 206 (step S22). Here, the processors 110 cause the measurement apparatus 200 to measure the same region on the surface of the specimen 206 multiple times (e.g., five times) without changing the setting of the measurement apparatus 200 made on the data obtaining screen 141, and obtain multiple (e.g., five sets of) measurement data items. More specifically, the processors 110 control the measurement apparatus 200 so as to repeat z-stack imaging multiple times without changing the setting.

Upon obtainment of the measurement data, the processors 110 calculate the height data on the specimen 206 (step S23). Here, the processors 110 perform the height data calculation process shown in FIG. 9, thereby calculating multiple height data items on the specimen 206, based on the multiple measurement data items obtained in step S22.

In the processes shown in FIG. 9, the processors 110 compensate the variation in position in repetitive measurement by the measurement apparatus 200 (steps S31 to S33). The measurement data items obtained by the repetitive measurement are data items generated by the measurement apparatus 200 sequentially imaging the specimen 206 multiple times. The measurement data items are data items taken by imaging at different times. Accordingly, since, for example, a drift of the X-Y stage 214 can occur, complete matching of the measurement range is not guaranteed. The processes in steps S31 and S32 compensate the variation in the data value due to variation in position (measurement range) occurring between measurement data items. Such compensation before measurement is specifically effective for the surface texture measurement for measuring a fine structure on the surface of the specimen 206.

After the processing shown in FIG. 9 is started, the processors 110 first calculate the height data, based on each of the measurement data items, and further generate an extended image (step S31). Note that more strictly, each of the measurement data items is a set of confocal image data items or a set of non-confocal image data items that are different in the height direction. That is, in step S31, the processors 110 calculate the height data every time of z-stack imaging, and generate extended image data using the luminance of the confocal image data or the non-confocal image data corresponding to the height indicated by the height data. It is desirable that the extended image data be laser extended image data.

Next, the processors 110 compensate the variation in position in directions orthogonal to the height direction, i.e., the XY directions, based on multiple extended image data items (step S32). That is, in steps S31 and S32, based on the multiple measurement data items, the variation in position in the XY directions is compensated. More specifically, in step S32, the processors 110 perform a pattern matching process based on luminance information on each pixel included in the extended image data. Furthermore, the processors 110 adopt, as a reference, the XY coordinates of any of the extended image data items (e.g., a measurement data item 10 in FIG. 10), and shift the XY coordinates (XY positions) of the remaining extended image data items (e.g., from an image data item 20 to an image data item 50 in FIG. 10), thereby matching the coordinates of an overlapping region 60 matched by the pattern matching process among extended image data items (e.g., from the image data item 10 to the image data items 50 in FIG. 10). Accordingly, even in a case of measurement of the surface texture of the specimen 206 having fine irregularities, during calculation of the degree of variation in height described later, for example, the heights between tops and bottoms of the irregularities are compared with each other, which can prevent the variation in height from being calculated in an excessive or underestimated manner.

After the variation in position in the XY directions is compensated, the processors 110 compensate the variation in position in the height direction, based on height data items of the overlapping portion 60 identified in step S32 (step S33). That is, after the compensation of the variation in position in the XY directions, the processors 110 compensate the variation in position in the Z direction. More specifically, in step S33, the processors 110 extract the height data on the overlapping portion identified in step S32, as the height data at the XY positions whose variation in position is compensated in step S32, from among the height data items calculated in step S31. As shown in FIG. 11, a height data item serving as a reference (hereinafter, described as a reference height data item; e.g., the height data D3) is selected from a dataset DS1 that is a set of the extracted height data items (D1 to D5), and with the height level of the reference height data item, the height levels of the other height data items (e.g., the height data items D1, D2, D4 and D5) are aligned. More specifically, for example, the processors 110 calculate the difference value of heights between the reference height data item (e.g., the height data D3) and a remaining height data item (e.g., the height data item D1) on a pixel-by-pixel basis, apply a statistical process to the difference values on the multiple pixels, and calculate the representative value of the difference values. The statistical process described here is a first statistical process, and is, for example, an averaging process, or a process of extracting the medium value. Furthermore, the calculated representative value is used to shift the remaining height data items (e.g., the height data item D1).

The processors 110 repeat the process of step S33 for all the height data items (e.g., the height data items D1, D2, D4 and D5) other than the reference height data item (e.g., the height data item D3), thereby updating the height data (step S34). More specifically, the processors 110 can correct the distribution of height data items from a distribution 70 to a distribution 80, and align the height level. Accordingly, a dataset DS2 including corrected height data items (e.g., height data items D1a, D2a, D3a, D4a and D5a) obtained by removing the effects of the drift in the Z caused by the X-Y stage 214 can be obtained.

After the calculation of the height data is finished, the processors 110 calculate the degree of variation in height measured by the measurement apparatus 200, based on the height data items calculated in step S23 (step S24). Here, the processors 110 first apply a statistical process to the heights of multiple height data items with respect to each measurement point (pixel), and calculate the degree of variation in height at each measurement point. The statistical process performed here is a second statistical process, and calculates the standard deviation, variance, etc., for example. Subsequently, the processors 110 apply a statistical process to multiple degrees of variations that include the degrees of variations in height at corresponding measurement points, and calculate a representative value of the degree of variation in height measured by the measurement apparatus 200, i.e., the degree of variation in measurement. The statistical process described here is a third statistical process, and is, for example, an averaging process, or a process of extracting the medium value.

After calculation of the degree of variation in height is finished, the processors 110 calculate the height parameter value of the surface texture of the specimen 206, based on the measurement data (step S25). Here, the processors 110 may calculate the height parameter value of the surface texture of the specimen 206, based on the multiple measurement data items obtained in step S22. For example, based on at least one of the height data items calculated in step S23 based on the multiple measurement data items, the height parameter value of the surface texture may be calculated. The processors 110 may calculate the height parameter value of the surface texture of the specimen 206, based on the height data calculated based on at least one of the multiple measurement data items obtained in step S22 without compensating the variation in position. Note that, here, the height parameter of the surface texture, which is calculated as the parameter value, is a parameter representing the surface roughness, such as Sa (arithmetic average height), Sz (maximum height), or Sq (root-mean-square height).

After the degree of variation in height and the height parameter value are calculated, the processors 110 evaluate the appropriateness of the setting of the measurement apparatus 200, based on comparison between the height parameter value of the surface texture calculated in step S25 and the degree of variation in height calculated in step S24 (step S26). Specifically, the processors 110 evaluate the appropriateness of the current objective lens (objective lens C) for the measurement of the surface texture of the specimen 206, based on the comparison between the height parameter value and the degree of variation in height. More specifically, the processors 110 calculate the ratio between the height parameter value and the degree of variation in height. When the ratio of the degree of variation to the measurement value is equal to or higher than a predetermined threshold, the processors 110 determine that the reliability of the measurement value is low, and evaluate the appropriateness of the setting low. On the other hand, when the ratio of the degree of variation to the measurement value is lower than the predetermined threshold, the processors 110 determine that the reliability of the measurement value is high, and evaluate the appropriateness of the setting high. For example, the evaluation result may be a two-grade evaluation of good (OK)/bad (NG). Alternatively, the evaluation may be made with three or more grades (e.g., three grades of good, bad, and normal; five grades from one star to five stars, etc.). The evaluation result is not limited to discreet evaluation. Alternatively, evaluation may be made with continuous values (e.g., scores, such as 83.5 points).

After the appropriateness evaluation is finished, lastly, the processors 110 cause the display device 140 to display the evaluation result about the appropriateness of the setting obtained in step S26 (step S27). Specifically, for example, as shown in FIG. 12, the processors 110 cause the display device 140 to display, as an evaluation result, appropriateness information 142*a* indicating whether the setting of the objective lens is appropriate or not or the degree of the appropriateness, in the region R6 on the lens selection assist screen 142. Note that the appropriateness information 142*a* shown in FIG. 12 is an example indicating the degree of the appropriateness (the fourth grade of five-grade evaluation).

As described above, the measurement system 1 according to this embodiment performs the lens selection support process shown in FIG. 7, thereby allowing the user to easily recognize the appropriateness of the current setting of the measurement apparatus 200, in particular, the appropriateness of the setting of the objective lens. Consequently, before measurement of the surface texture is started depending on the evaluation result, the user can switch the objective lens, and avoid measurement of the surface texture based on the measurement data items with low reliability. Consequently, the surface texture can be precisely measured. Based on the measured surface texture, the specimen can be correctly evaluated.

Each of FIGS. 13 to 17 shows another example of a lens selection assist screen 142 after lens evaluation. FIG. 12 shows the example where the appropriateness information 142*a* is displayed as the evaluation result. Alternatively, the processors 110 may cause the display device 140 to display auxiliary information, which accompanies the evaluation result.

Figure 13:
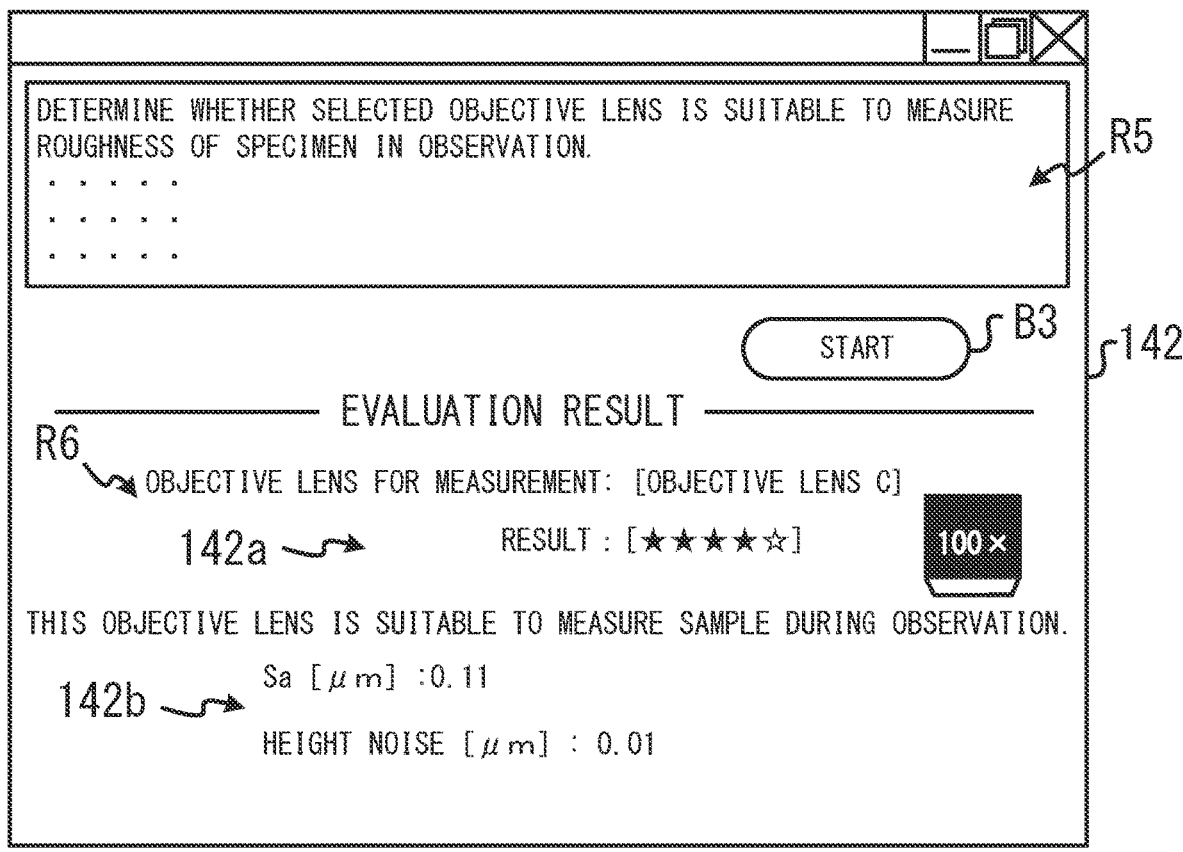
FIG. 13 shows another example of a lens selection assist screen 142 after lens evaluation.

For example, as shown in FIG. 13, the processors 110 may cause the display device 140 to display ground information 142*b* indicating the determination ground about the evaluation result, together with the appropriateness information 142*a*, which is an example of the evaluation result, in the region R6 on the lens selection assist screen 142. Note that in FIG. 13, the ground information 142*b* includes, for example, Sa that is an example of the measurement value of the surface texture by the measurement apparatus 200, and the height noise that is an example of the degree of variation in measurement by the measurement apparatus 200. As described above, the auxiliary information displayed with the evaluation result may include the ground information.

The ground information is thus displayed, which facilitates the user's reliance on the evaluation result. The ground information can be used as a determination indication for the user's determination of whether to perform the surface texture measurement with the current setting based on the evaluation result or not. In particular, when the evaluation result is neutral (e.g., the second degree in three-grade evaluation, etc.), this information can support the user's determination.

Figure 14:
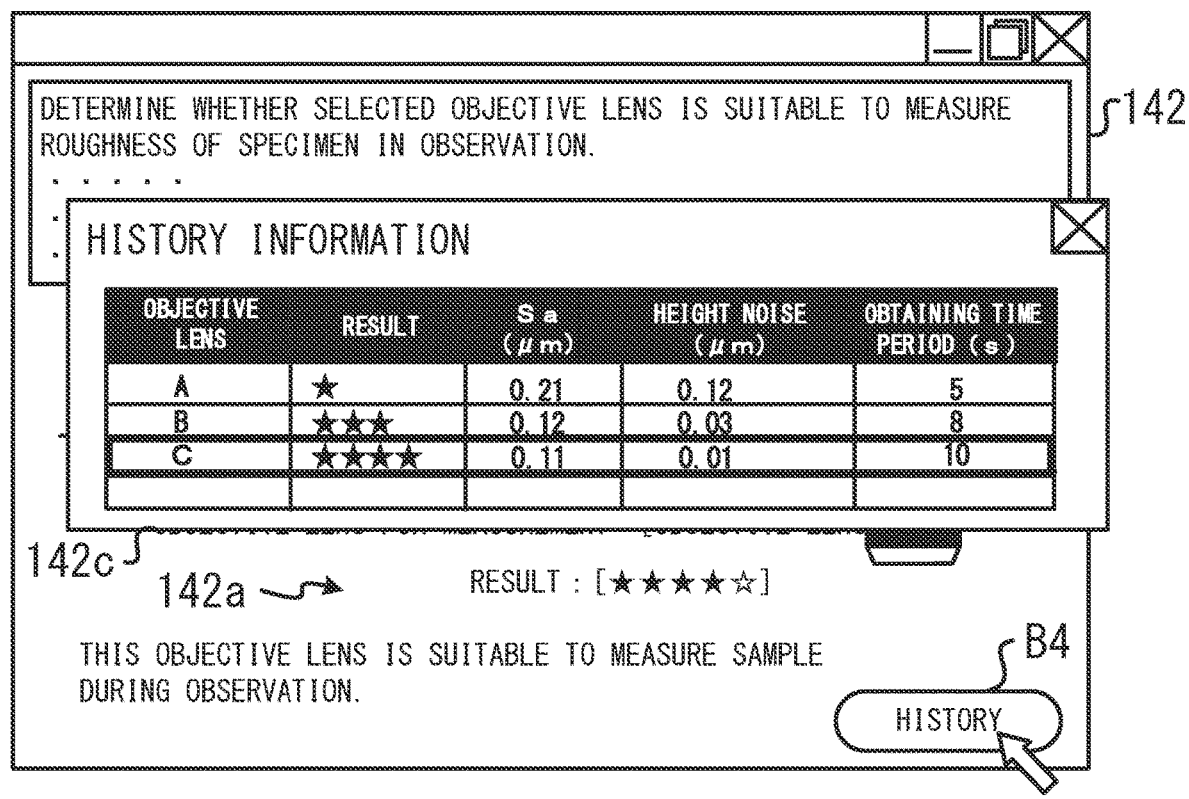
FIG. 14 shows still another example of a lens selection assist screen 142 after lens evaluation.

The measurement system 1 has a function of displaying the histories of the evaluation results and auxiliary information. For example, as shown in FIG. 14, by pressing a history button (button B4) on the lens selection assist screen 142, the processors 110 may display history information 142*c* on the foreground over the lens selection assist screen 142 in a pop-up manner, for instance. At the history information 142*c*, results of the lens selection support process having been performed to the specimen 206 so far are listed. According to the example in FIG. 14, the evaluation results of evaluation of the settings of the objective lenses A, B and C, ground information, and obtaining time periods (measurement time periods) are included in the history information 142*c*.

The history information is displayed, which allows the user to compare the evaluation results with the other objective lenses with the evaluation result of the current objective lens, and to select the objective lens to be used for surface texture. Accordingly, even in a case where the measurement apparatus 200 includes the objective lenses, the objective lens to be used for measurement can be easily selected. Note that the history information may include comments added by the user, which are appropriately allowed to be saved in the storage devices 120 and read from the storage devices 120. Accordingly, the user can more easily select the objective lens.

Figure 15:
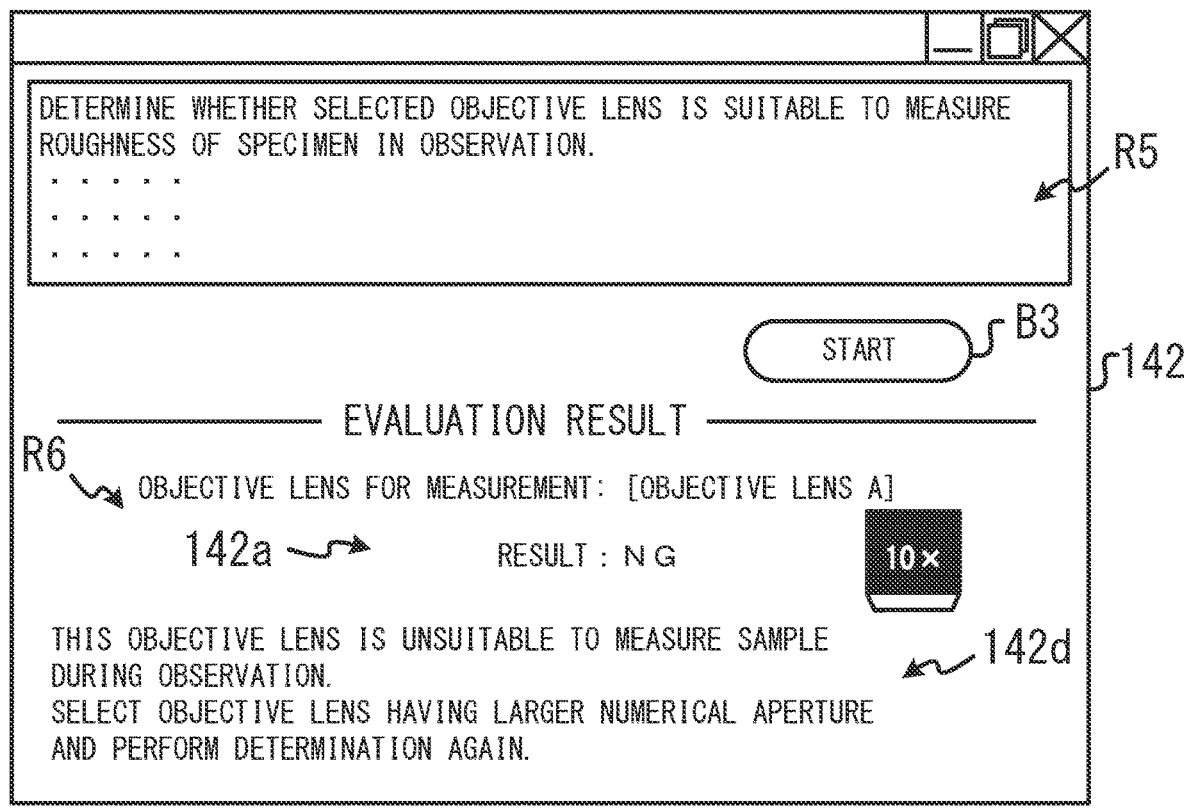
FIG. 15 shows yet another example of a lens selection assist screen 142 after lens evaluation.

For example, as shown in FIG. 15, the processors 110 may cause the display device 140 to display coping information 142d indicating a coping method that the user can take for the evaluation result, together with the appropriateness information 142a, which is an example of the evaluation result, in the region R6 on the lens selection assist screen 142. Note that in FIG. 15, the coping information 142d suggests a possibility of improving the appropriateness of the setting by the user selecting an objective lens having a higher numerical aperture. As described above, the auxiliary information displayed with the evaluation result may include the coping information. Note that the processors 110 may cause the display device 140 to display the coping information only when the evaluation result is lower than a predetermined reference.

Displaying the coping information can provide the user with information about coping that can improve the appropriateness of the setting even when an evaluation result undesirable for the user is displayed. This allows the user to avoid evaluating multiple objective lenses haphazardly, and find an appropriate setting promptly.

Figure 16:
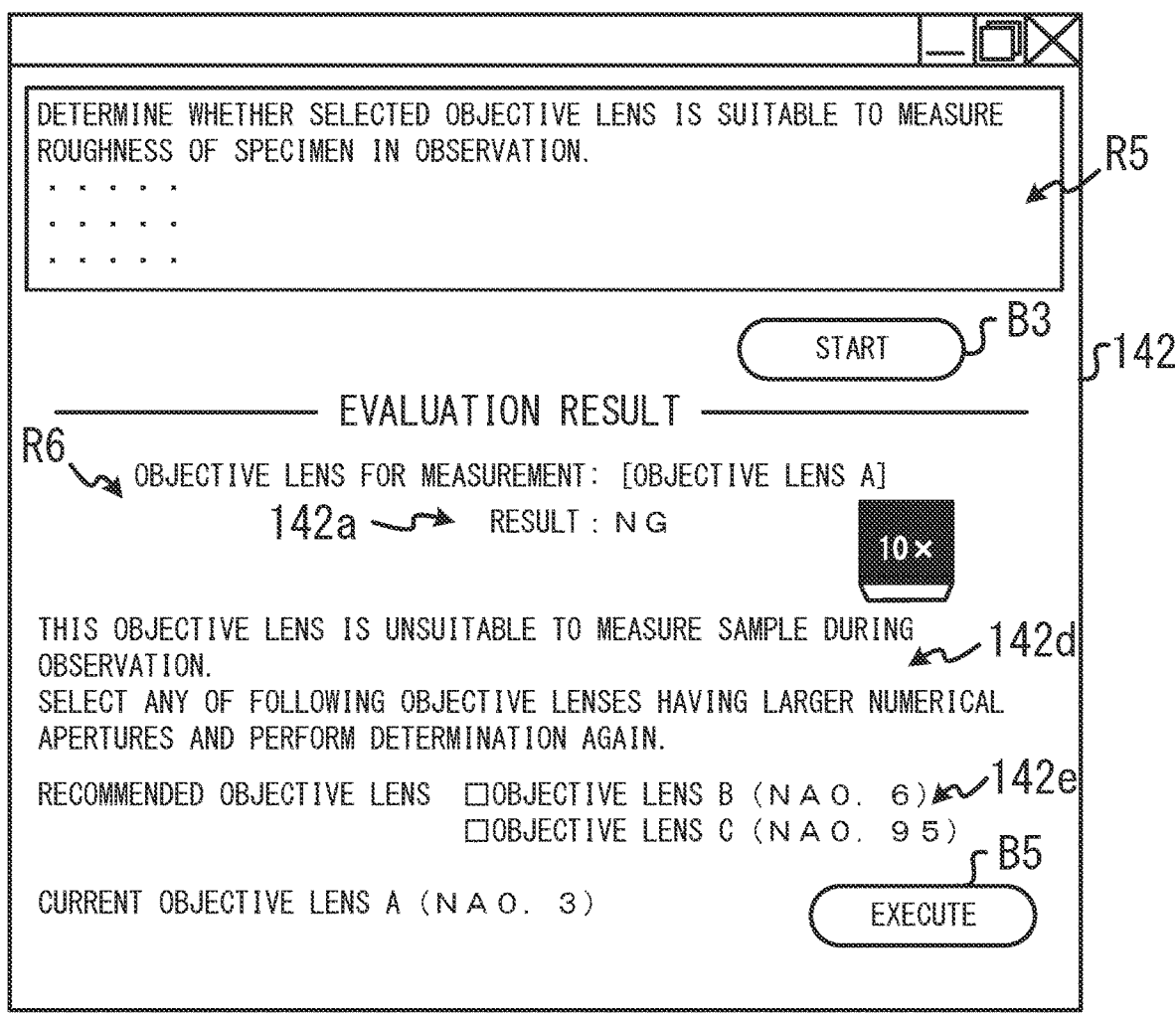
FIG. 16 shows still another example of a lens selection assist screen 142 after lens evaluation.

For example, as shown in FIG. 16, the processors 110 may cause the display device 140 to display recommended setting information 142e indicating recommended settings, together with the appropriateness information 142a, in the region R6 on the lens selection assist screen 142. Specifically, as the recommended setting information 142e, the processors 110 may cause the display device 140 to display, as recommended objective lenses, objective lenses having a higher numerical aperture than the current objective lens among one or more objective lenses that are included in the measurement apparatus 200 and are different from the current objective lens. That is, the processors 110 may propose the objective lenses having a higher numerical aperture than the current objective lens, as the recommended objective lenses. As described above, the auxiliary information displayed with the evaluation result may include the recommended setting information.

Note that the recommended setting information 142e may be displayed when the evaluation result is lower than a predetermined reference. As shown in FIG. 16, the processors 110 may cause the display device 140 to display the recommended setting information 142e with the coping information 142d. That is, the processors 110 may cause the display device 140 to display the recommended setting information 142e, depending on the appropriateness information 142a. Any of the objective lenses proposed by the recommended setting information 142e may be selected, and an execution button (button B5) may be pressed, thereby allowing the processors 110 to control the measurement apparatus 200 to change the objective lens of the measurement apparatus 200 to the selected objective lens.

Displaying the recommended setting information can provide the user with specific alternative options even when an undesirable evaluation result is displayed. Accordingly, the user can select a setting from among the provided options, which can improve the appropriateness of the setting with high probability. Consequently, the user can avoid evaluating multiple objective lenses haphazardly, and find an appropriate setting promptly.

The example of evaluating the appropriateness of the setting, based on the reliability of the measurement data based on the ratio between the measurement value and the degree of variation is described above. Alternatively, the processors 110 may comprehensively evaluate the appropriateness of the setting of the measurement apparatus 200 in consideration not only of the evaluation of reliability based on the ratio between the measurement value and the degree of variation but also additionally of another evaluation. For example, in consideration of the time period required for measurement (measurement speed), the appropriateness of the setting may be evaluated.

Figure 17:
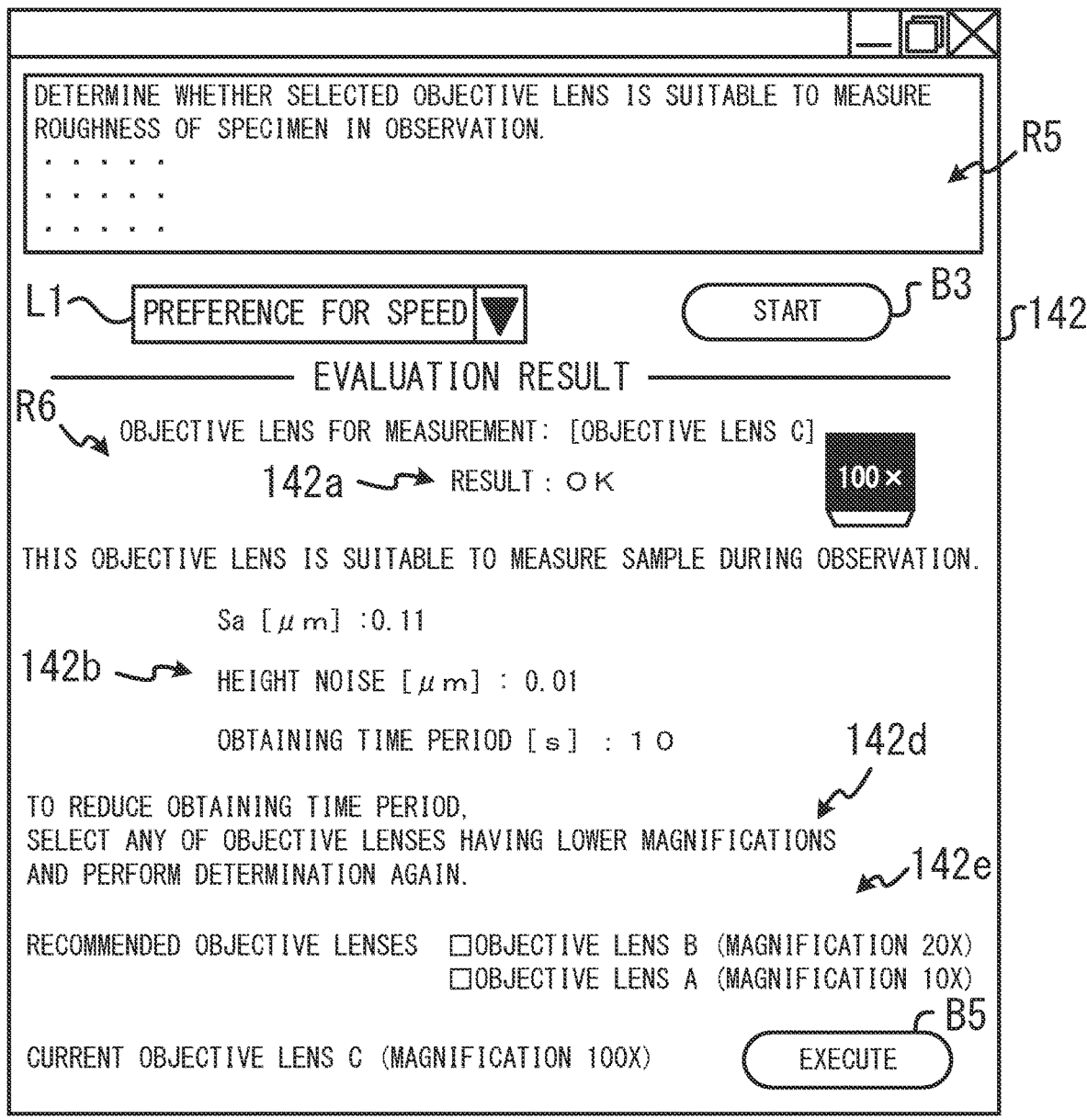
FIG. 17 shows yet another example of a lens selection assist screen 142 after lens evaluation.

For example, as shown in FIG. 17, the processors 110 may cause the display device 140 to display a list box L1 for setting the degree of preference for the measurement speed, on the lens selection assist screen 142. The processors 110 may evaluate the appropriateness of the current objective lens, based on the measurement value of the surface texture of the specimen 206, the degree of variation in measurement by the measurement apparatus 200, and the degree of preference for the measurement speed (in other words, a measurement mode indicating the priority degree of measurement precision over the measurement speed). In this case, as shown in FIG. 17, it is desirable that the ground information 142b displayed in the region R6 include the obtaining time period. Also as shown in FIG. 17, the recommended setting information 142e may be also displayed even when the evaluation result is a desirable result. A setting having a more desirable possibility may be recommended for the user.

Evaluation of the setting in consideration of the measurement speed in addition to the reliability (precision) as described above allows the user to easily find a setting that has precision sufficient to measure the surface texture and can achieve quick measurement. This can prevent the measurement time period from being sacrificed due to high precision beyond necessity. Consequently, for example, a situation can be avoided where a user having no professional expertise executes measurement with excessively high precision and reduces the operation efficiency.

Second Embodiment

Figure 18:
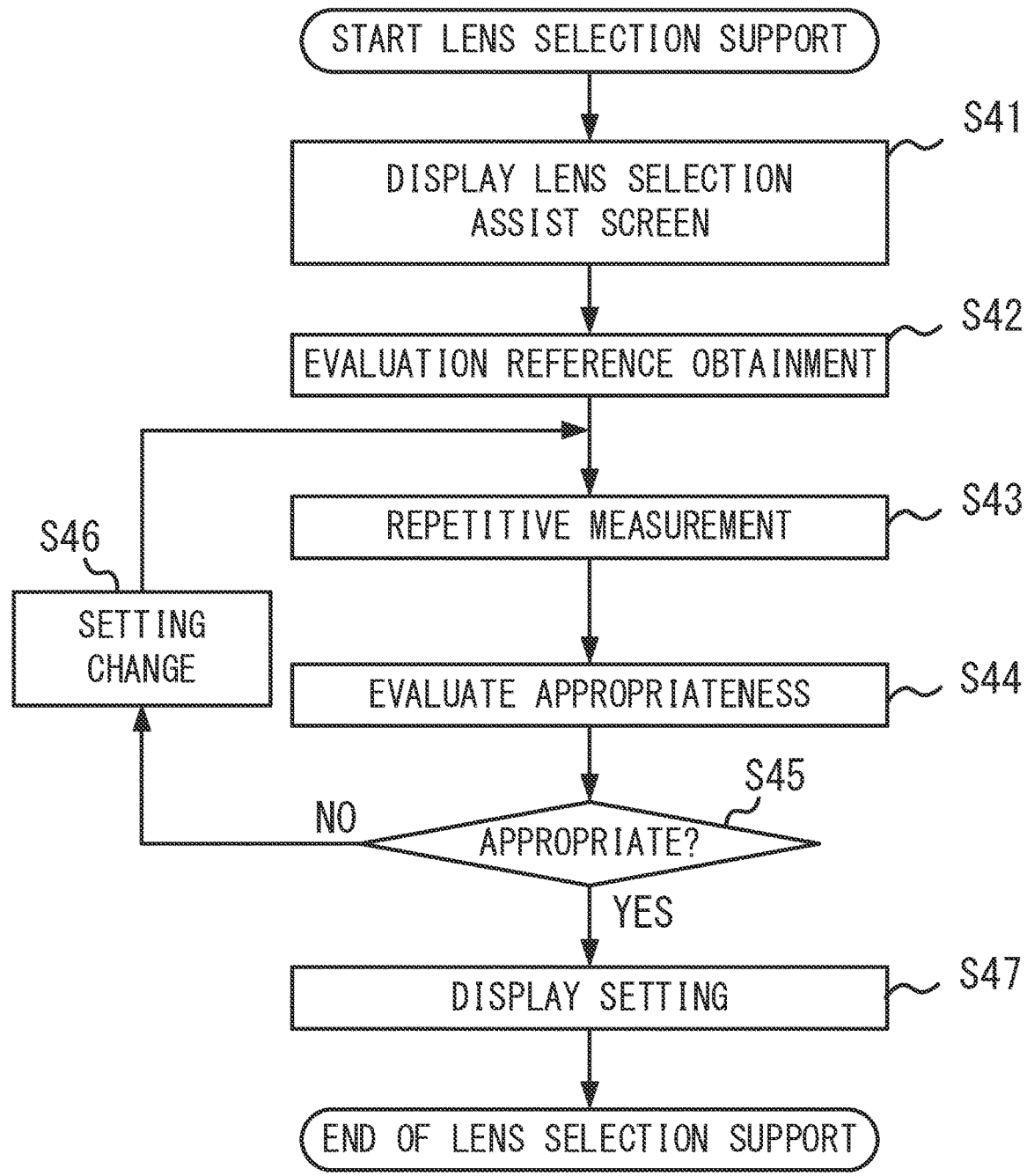
FIG. 18 is a flowchart showing an example of a lens selection support process according to a second embodiment.
Figure 19:
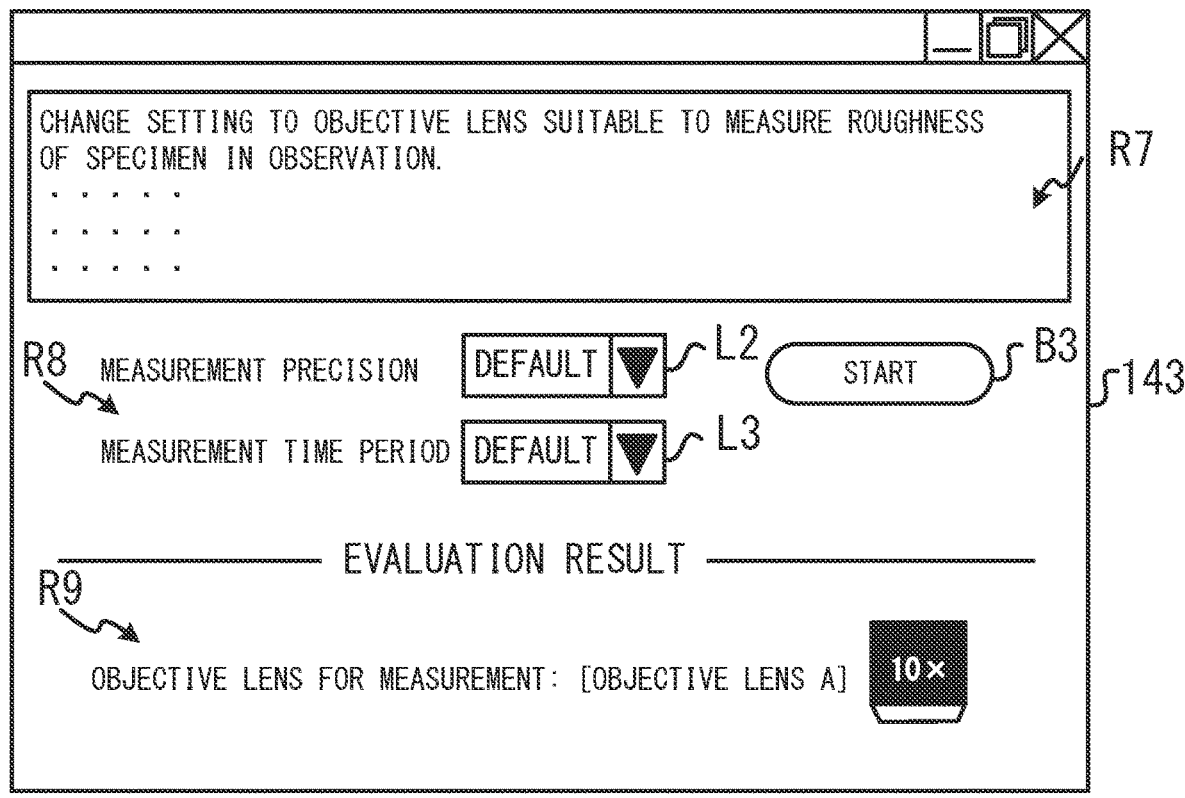
FIG. 19 exemplifies a lens selection assist screen 143 before lens evaluation.
Figure 20:
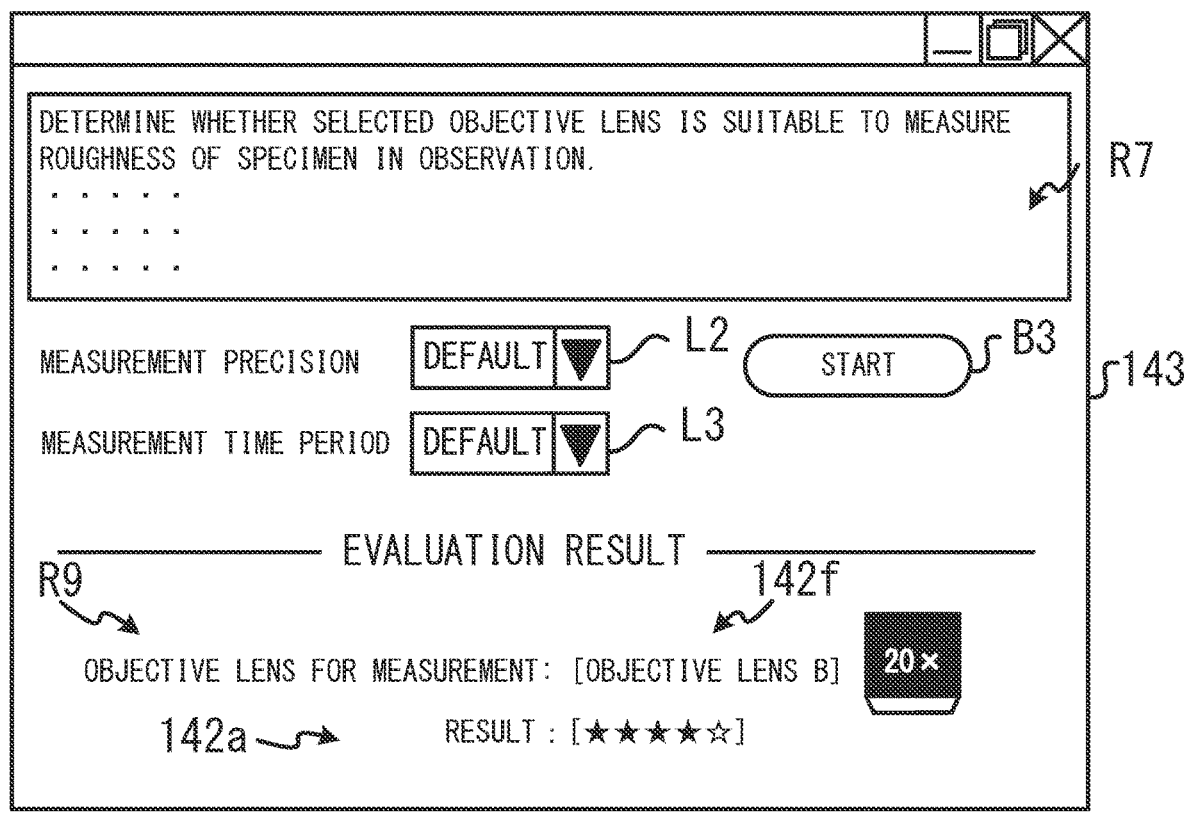
FIG. 20 exemplifies a lens selection assist screen 143 after lens evaluation.

FIG. 18 is a flowchart showing an example of a lens selection support process according to this embodiment. FIG. 19 exemplifies a lens selection assist screen 143 before lens evaluation. FIG. 20 exemplifies a lens selection assist screen 143 after lens evaluation. Hereinafter, referring to FIGS. 18 to 20, a specific example of the measurement method shown in FIG. 4 is described in detail. Note that according to this embodiment, a case where the measurement system 1 automatically recognizes the appropriateness of the setting of the objective lens of the measurement apparatus 200, and changes the setting to an appropriate one is exemplified and is described.

The lens selection support process shown in FIG. 18 is started by, for example, the user pressing a lens selection support button (button B1) on the data obtaining screen 141 shown in FIG. 6.

When the processing shown in FIG. 18 is started, the processors 110 first cause the display device 140 to display the lens selection assist screen 143 shown in FIG. 19 (step S41). The lens selection assist screen 143 includes a region R7 where a description of the lens selection support process is displayed, a region R8 where the evaluation references are set, and a region R9 where the result of the appropriateness evaluation of the objective lens set by the measurement system 1 through the lens selection support process is displayed. In the region R8, a list box L2 and a list box L3 are displayed. In the list box L2, the degree of measurement precision required for setting is designated. In the list box L3, the degree of measurement time period (measurement speed) required for setting is designated. Note that in step S41, the appropriateness of the objective lens has not been evaluated yet. Accordingly, in the region R9, no evaluation result is displayed, and only information on the currently set objective lens is displayed.

Subsequently, when the user designates the evaluation references in the list boxes L2 and L3 and presses a start button (button B3), the processors 110 obtain the evaluation references from the list boxes L2 and L3 (step S42), and subsequently, start processes in and after step S43 (steps S43 to S47).

First, the processors 110 cause the measurement apparatus 200 to repetitively measure the surface of the specimen 206 (step S43), and evaluate the appropriateness of the current setting (specifically, the current objective lens) (step S44). Note that the process of step S43 is similar to the process in step S22 of FIG. 7. The process of step S44 is similar to the processes of steps S23 to S26 in FIG. 7 except in that the evaluation reference obtained in step S42 is used to input the appropriateness evaluation.

Subsequently, the processors 110 determine whether the setting is appropriate or not based on the evaluation result in S44 (step S45). When the processors 110 determine that it is inappropriate, they change the setting of the measurement apparatus 200 (step S46). Note that the setting to be changed in step S46 is a setting of the objective lens. Specifically, when the appropriateness evaluation in step S44 does not satisfy the measurement precision designated in the list box L2, the processors 110 change the objective lens set for the measurement apparatus 200 to an objective lens having a higher numerical aperture than the current objective lens. When the appropriateness evaluation in step S44 does not satisfy the measurement speed designated in the list box L3, the processors 110 change the objective lens set for the measurement apparatus 200 to an objective lens having a lower magnification than the current objective lens.

Until the setting is determined to be appropriate in step S45, the processors 110 repeat the processes of steps S43 to S46. When the setting is determined to be appropriate (YES in step S45), the processors 110 cause the display device 140 to display the current setting as shown in FIG. 20 (step S47). Note that FIG. 20 shows the example where information 142f on the currently set objective lens, and the appropriateness information 142a are displayed in the region R9 for displaying the evaluation result of the appropriateness.

As described above, the measurement system 1 according to this embodiment performs the lens selection support process shown in FIG. 18, which can automatically recognize the appropriateness of the setting of the objective lens, and automatically change the setting to an appropriate one for measuring the surface texture. Consequently, only by setting the degrees of preferences for the precision and the measurement time period, the user can appropriately measure the surface texture of the specimen 206 without specific regard to the current setting of the objective lens.

The embodiments described above are specific examples in order to facilitate understanding of the invention. The present invention is not limited to these embodiments. Modified embodiments obtained by modifying the embodiments described above, and alternative embodiments that substitute the embodiments described above can be encompassed. That is, each embodiment may allow the configuration elements to be modified in a range without departing from the spirit and scope. By appropriately combining multiple configuration elements disclosed in one or more embodiments, new embodiments can be implemented. Some configuration elements may be removed from the configuration elements indicated in each embodiment, or some configuration elements may be added to the configuration elements indicated in the embodiments. The order of the processing procedures shown in each embodiment may be replaced as long as there is no contradiction. That is, the measurement system, the measurement support method, and the computer-readable medium of the present invention may be variously modified and changed in a range without departing from the description of the claims.

For example, according to the aforementioned first embodiment, the example is described where the appropriateness of the setting is evaluated with the setting designated by the user, and the evaluation result is displayed. Alternatively, the measurement system may evaluate the setting appropriateness of multiple settings irrespective of the designation by the user, and display the evaluation results thereof. As described above, the appropriateness of the multiple settings is automatically evaluated and displayed, which allows easy recognition of an appropriate setting from among the displayed evaluation results of the settings, without the user's setting operation before evaluation.

According to the second embodiment described above, the example is described where when the evaluation result that the appropriateness does not satisfy the reference is obtained, the measurement system changes the setting and re-evaluates the appropriateness. That is, according to the second embodiment, the example is described where the control apparatus 100 changes the setting of the measurement apparatus 200 depending on the evaluation result about the appropriateness of the setting, causes the measurement apparatus 200 to repetitively measure the surface of the specimen 206 with the changed setting, evaluates the appropriateness of the changed setting for measurement of the surface texture of the specimen 206, based on comparison between the measurement value of the surface texture of the specimen 206 calculated from a measurement data item output from the measurement apparatus 200 after the setting is changed, and the degree of variation in measurement by the measurement apparatus 200 calculated from the multiple measurement data items output from the measurement apparatus 200 after the setting is changed, and fixes the setting of the measurement apparatus 200 when the evaluation result satisfies the predetermined reference. Alternatively, the control apparatus may sequentially change the setting of the measurement apparatus to predetermined settings, and evaluate the appropriateness with each of the settings. Furthermore, this apparatus may automatically determine the optimal setting, based on the evaluation results with the respective settings, and fix the setting of the measurement apparatus. This allows the user to use the measurement apparatus with the optimal setting without previous knowledge.

According to the embodiment described above, the ground information, the coping information, the recommended setting information and the like are exemplified as the auxiliary information to be displayed with the evaluation result. However, the auxiliary information is not limited thereto. The auxiliary information may be, for example, multiple height data items used for the second statistical process described above, and information that visualizes the information on the degree of variation obtained by the second statistical process. Specifically, the information may be information where the degree of variation is overlaid on the height profile at a certain section. Such information on the height at each measurement point and on the variation in height may be provided for the user in a manner accompanying the evaluation result.

According to the embodiments described above, the reliability and the measurement speed are exemplified as the references for evaluation of the appropriateness of setting. Alternatively, the appropriateness may be evaluated with another reference. For example, the appropriateness may be evaluated in consideration of the multiple scores disclosed in Japanese Patent Laid-Open No. 2016-173294. Alternatively, the appropriateness may be evaluated in consideration of the rate of dark portions included in an image.

According to the embodiments described above, the objective lens setting is exemplified as the example of setting for evaluating the appropriateness. However, the setting for evaluating the appropriateness is not limited to the objective lens setting. The surface roughness is exemplified as the surface texture to be measured. However, the surface texture is not limited to the surface roughness.

In this specification, representation of "based on A" does not mean "based only on A", but means "based on at least A", and further means "based partially on at least A". That is, "based on A" may be based on B in addition to A, and may be based on part of A.

In this specification, terms modifying nouns, such as "first" and "second", do not limit the amounts or order of elements represented by the nouns. The terms are used to discriminate two or more elements from each other, and are nothing less or nothing more. Consequently, identification of "first" and "second" elements does not mean that the "first" element precedes the "second" element, and does not negate presence of a "third" element.

What is claimed is:

1. A measurement system, comprising:
an optical measurement instrument that measures a surface of a specimen, the measurement instrument comprising an objective lens; and
a control apparatus that controls the measurement instrument,
wherein the control apparatus includes:
at least one non-transitory computer-readable media that includes an instruction; and
at least one processor that executes the instruction,
wherein the instruction is executable to cause the at least one processor to execute an operation,
wherein the operation includes:
causing the measurement instrument to repetitively measure the surface of the specimen without changing a setting; and
evaluating an appropriateness of the setting for measuring a surface texture of the specimen, based on a comparison between a measurement value of the surface texture of the specimen calculated from a measurement data item output from the measurement instrument, and a degree of variation in measurement by the measurement instrument calculated from a plurality of measurement data items output from the measurement instrument,
wherein the setting includes a setting of the objective lens, and
wherein the evaluating the appropriateness of the setting includes evaluating an appropriateness of the objective lens for the surface texture of the specimen, based on the measurement value of the surface texture of the specimen, the degree of variation in measurement by the measurement instrument, and a measurement mode indicating a priority degree of measurement precision over a measurement speed.

2. The measurement system according to claim 1, wherein the evaluating the appropriateness of the setting includes:
calculating a height data item on the specimen, based on each of the measurement data items;
calculating a height parameter value of the surface texture of the specimen, based on the calculated height data item;
calculating a degree of variation in height measured by the measurement instrument, based on a plurality of the calculated height data items; and
evaluating the appropriateness of the setting, based on a comparison between the height parameter value of the surface texture, and the degree of variation in height.

3. The measurement system according to claim 2, wherein the calculating the degree of variation in height measured by the measurement instrument includes compensating for a variation in position during repetitive measurement by the measurement instrument, based on the plurality of height data items.

4. The measurement system according to claim 3, wherein the compensating for the variation in position includes:
compensating for the variation in position in a direction intersecting with a height direction, based on the plurality of height data items; and
compensating for the variation in position in the height direction, based on the plurality of height data items, after compensating for the variation in position in the direction intersecting with the height direction.

5. The measurement system according to claim 1, wherein the operation further includes issuing a notification of an evaluation result about the appropriateness of the setting.

6. The measurement system according to claim 5, wherein the issuing the notification of the evaluation result includes causing a display device to display whether the setting is appropriate or not, or to display a degree of the appropriateness of the setting, as the evaluation result.

7. The measurement system according to claim 5, wherein the issuing the notification of the evaluation result includes causing a display device to display, with the evaluation result, auxiliary information that includes at least one of information indicating a determination ground for the evaluation result and information indicating a coping method that a user can take with respect to the evaluation result.

8. The measurement system according to claim 7, wherein the information indicating the determination ground includes at least one of the measurement value of the surface texture of the specimen, the degree of variation in measurement by the measurement instrument, and a time period required for the measurement.

9. The measurement system according to claim 1, wherein:
the measurement instrument further comprises at least one objective lens different from the objective lens, and
the evaluating the appropriateness of the setting further includes evaluating an appropriateness of the at least one objective lens.

10. The measurement system according to claim 9, wherein the operation further includes causing a display device to display an evaluation result about the appropriateness of the at least one objective lens depending on an evaluation result about the appropriateness of the objective lens.

11. The measurement system according to claim 1, wherein:
the measurement instrument further comprises at least one objective lens different from the objective lens, and
the operation further includes causing a display device to display, as a recommended objective lens, an objective lens from among the at least one objective lens having a higher numerical aperture than the objective lens, depending on an evaluation result about the appropriateness of the objective lens.

12. The measurement system according to claim 1, wherein the measurement instrument comprises a confocal microscope apparatus.

13. A measurement system, comprising:
an optical measurement instrument that measures a surface of a specimen; and
a control apparatus that controls the measurement instrument,
wherein the control apparatus includes:
at least one non-transitory computer-readable media that includes an instruction; and
at least one processor that executes the instruction,
wherein the instruction is executable to cause the at least one processor to execute an operation, and
wherein the operation includes:
causing the measurement instrument to repetitively measure the surface of the specimen without changing a setting;
evaluating an appropriateness of the setting for measuring a surface texture of the specimen, based on a comparison between a measurement value of the surface texture of the specimen calculated from a measurement data item output from the measurement instrument, and a degree of variation in measurement by the measurement instrument calculated from a plurality of measurement data items output from the measurement instrument;
changing the setting depending on an evaluation result of the appropriateness of the setting;
causing the measurement instrument to repetitively measure the surface of the specimen with the changed setting;
evaluating an appropriateness of the changed setting for measuring the surface texture of the specimen, based on a comparison between a measurement value of the surface texture of the specimen calculated from a measurement data item output from the measurement instrument after the setting is changed, and a degree of variation in measurement by the measurement instrument calculated from a plurality of measurement data items output from the measurement instrument after the setting is changed; and
fixing the setting when the evaluation result satisfies a predetermined reference.

14. A measurement support method, including:
repetitively measuring a surface of a specimen without changing a setting of a measurement instrument, the measurement instrument comprising an objective lens; and
evaluating an appropriateness of the setting for measuring a surface texture of the specimen, based on a comparison between a measurement value of the surface texture of the specimen calculated from a measurement data item output from the measurement instrument, and a degree of variation in measurement by the measurement instrument calculated from a plurality of measurement data items output from the measurement instrument,
wherein the setting includes a setting of the objective lens, and
wherein the evaluating the appropriateness of the setting includes evaluating an appropriateness of the objective lens for the surface texture of the specimen, based on the measurement value of the surface texture of the specimen, the degree of variation in measurement by the measurement instrument, and a measurement mode indicating a priority degree of measurement precision over a measurement speed.

15. A non-transitory computer-readable medium storing a program, the program being executable to cause a computer to execute processes comprising:
causing a measurement instrument comprising an objective lens to repetitively measure a surface of a specimen without changing a setting; and
evaluating an appropriateness of the setting for measuring a surface texture of the specimen, based on a comparison between a measurement value of the surface texture of the specimen calculated from a measurement data item output from the measurement instrument, and a degree of variation in measurement by the measurement instrument calculated from a plurality of measurement data items output from the measurement instrument,
wherein the setting includes a setting of the objective lens, and
wherein the evaluating the appropriateness of the setting includes evaluating an appropriateness of the objective lens for the surface texture of the specimen, based on the measurement value of the surface texture of the specimen, the degree of variation in measurement by the measurement instrument, and a measurement mode indicating a priority degree of measurement precision over a measurement speed.

* * * * *